United States Patent
Gurelli et al.

(10) Patent No.: US 11,533,729 B2
(45) Date of Patent: Dec. 20, 2022

(54) TRANSPORT BLOCK SIZE DETERMINATION FOR DOWNLINK TRANSMISSIONS INCLUDING MULTIPLEXED DOWNLINK CONTROL INFORMATION

(71) Applicant: QUALCOMM Incorporated, San Diego, CA (US)

(72) Inventors: Mehmet Izzet Gurelli, San Diego, CA (US); Qiang Wu, San Diego, CA (US); Iyab Issam Sakhnini, San Diego, CA (US); Jun Ma, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/022,461

(22) Filed: Sep. 16, 2020

(65) Prior Publication Data
US 2022/0086840 A1    Mar. 17, 2022

(51) Int. Cl.
*H04W 72/04*    (2009.01)
*H04L 1/00*    (2006.01)
(Continued)

(52) U.S. Cl.
CPC ....... *H04W 72/0493* (2013.01); *H04L 1/0003* (2013.01); *H04L 1/1671* (2013.01); *H04L 5/0044* (2013.01); *H04W 72/042* (2013.01)

(58) Field of Classification Search
CPC ... H04L 1/0003; H04L 1/1671; H04L 5/0044; H04W 72/042; H04W 72/0493
See application file for complete search history.

(56) References Cited

U.S. PATENT DOCUMENTS 9,030,977 B2 *  5/2015  Chen .................... H04L 1/0002
                                                           370/310
9,160,486 B2 * 10/2015  Ko ........................ H04L 1/0073
(Continued)

FOREIGN PATENT DOCUMENTS

CA      3100850 A1    11/2019
CN    103703706 A  *   4/2014  .......... H04B 7/2612
(Continued)

OTHER PUBLICATIONS

ERICSSON: "Discussion Paper on Test Coverage for DL-SCH and UL-SCH Transport Block size Selection", 3GPP TSG-RANS Meeting#42-bis, 3GPP Draft, R5-091535 (Disc Paper on Test Coverage of DL-SCH and UL-SCH TB Size Selection), 3rd Generation Partnership Project (3GPP), Mobile Competence Centre, 650, Route Des Lucioles, F-06921 Sophia-Antipolis Cedex, France, vol. RAN WG5, No. Seoul, Korea, Mar. 23, 2009-Mar. 27, 2009, Mar. 23, 2009 (Mar. 23, 2009), 5 Pages, XP050616751, [retrieved on Mar. 23, 2009] p. 1, last paragraph.
(Continued)

*Primary Examiner* — Eric Nowlin
(74) *Attorney, Agent, or Firm* — Qualcomm Incorporated

(57) ABSTRACT

Methods, systems, and devices for wireless communications are described. A user equipment (UE) may receive a first downlink control information (DCI) scheduling a downlink transmission at the UE, where the first DCI includes an indication of a first resource allocation for the downlink transmission. The UE may determine that the downlink transmission includes a downlink data message multiplexed with second DCI. The UE may receive an indication of a second resource allocation for the second DCI. The UE may determine a transport block size (TBS) of the downlink data message based on the first resource allocation for the downlink transmission and the second resource allocation for the (Continued)

second DCI. The UE may then process the downlink transmission based on the TBS of the downlink data message.

29 Claims, 16 Drawing Sheets

(51) Int. Cl.
*H04L 1/16* (2006.01)
*H04L 5/00* (2006.01)

(56) References Cited

U.S. PATENT DOCUMENTS

| | | | | |
|---|---|---|---|---|
| 9,198,176 | B2* | 11/2015 | Kim | H04W 72/042 |
| 9,425,940 | B2* | 8/2016 | Park | H04L 27/26522 |
| 9,544,893 | B2* | 1/2017 | Kim | H04L 5/0053 |
| 10,034,282 | B2* | 7/2018 | Kim | H04W 72/12 |
| 10,834,664 | B2* | 11/2020 | Wang | H04W 48/12 |
| 11,363,587 | B2* | 6/2022 | Bi | H04W 68/02 |
| 2008/0225784 | A1* | 9/2008 | Tseng | H04L 1/1822 |
| | | | | 370/329 |
| 2010/0195614 | A1* | 8/2010 | Nimbalker | H04L 1/0025 |
| | | | | 370/330 |
| 2010/0290412 | A1* | 11/2010 | Ahn | H04L 5/0007 |
| | | | | 370/329 |
| 2011/0090808 | A1* | 4/2011 | Chen | H04L 1/0006 |
| | | | | 370/252 |
| 2011/0110296 | A1* | 5/2011 | Malladi | H04B 1/713 |
| | | | | 370/328 |
| 2013/0039272 | A1 | 2/2013 | Chen | |
| 2014/0133371 | A1* | 5/2014 | Park | H04L 5/001 |
| | | | | 370/280 |
| 2015/0163771 | A1* | 6/2015 | Kim | H04L 5/0048 |
| | | | | 370/329 |
| 2016/0044643 | A1* | 2/2016 | Kim | H04W 72/042 |
| | | | | 370/330 |
| 2016/0128028 | A1* | 5/2016 | Mallik | H04L 1/0039 |
| | | | | 370/336 |
| 2016/0128032 | A1* | 5/2016 | Wang | H04L 1/1819 |
| | | | | 370/329 |
| 2017/0079022 | A1* | 3/2017 | Kim | H04L 5/0048 |
| 2017/0150486 | A1* | 5/2017 | Ang | H04J 1/02 |
| 2019/0069321 | A1* | 2/2019 | Akkarakaran | H04L 5/0057 |
| 2019/0261256 | A1* | 8/2019 | Wang | H04W 48/12 |
| 2020/0396760 | A1* | 12/2020 | Yi | H04L 1/1864 |
| 2021/0045098 | A1* | 2/2021 | Bl | H04W 68/02 |
| 2022/0232544 | A1* | 7/2022 | Bai | H04L 5/0094 |

FOREIGN PATENT DOCUMENTS

| | | | | | |
|---|---|---|---|---|---|
| CN | 103703706 | B | * | 6/2017 | H04B 7/2612 |
| CN | 110099447 | A | * | 8/2019 | H04W 68/005 |
| EP | 3737188 | A1 | * | 11/2020 | H04W 68/005 |
| JP | 5719087 | B2 | * | 5/2015 | H04B 7/2612 |
| JP | 2021513240 | A | * | 5/2021 | |
| KR | 20200108320 | A | * | 9/2020 | |
| KR | 102418654 | B1 | * | 7/2022 | |
| WO | WO-2013009005 | A2 | * | 1/2013 | H04B 7/2612 |
| WO | WO-2013022272 | A2 | * | 2/2013 | H04L 27/2633 |
| WO | WO-2013009005 | A3 | * | 3/2013 | H04B 7/2612 |
| WO | WO-2013022272 | A3 | * | 4/2013 | H04L 27/2633 |
| WO | WO-2019148920 | A1 | * | 8/2019 | H04W 68/005 |
| WO | WO-2022133936 | A1 | * | 6/2022 | |
| WO | WO-2022154937 | A1 | * | 7/2022 | |

OTHER PUBLICATIONS

International Search Report and Written Opinion—PCT/US2021/047561—ISA/EPO—dated Jan. 10, 2022.

* cited by examiner

TRANSPORT BLOCK SIZE DETERMINATION FOR DOWNLINK TRANSMISSIONS INCLUDING MULTIPLEXED DOWNLINK CONTROL INFORMATION

FIELD OF TECHNOLOGY

The following relates to wireless communications, including transport block size (TBS) determination for downlink transmissions including multiplexed downlink control information (DCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support transport block size (TBS) determination for downlink transmissions including multiplexed downlink control information (DCI). Generally, the described techniques provide for the determination of a TBS associated with a downlink data message (e.g., downlink shared channel (DL-SCH) message) multiplexed with DCI (e.g., "piggyback" DCI) within a downlink transmission. In some aspects, a first DCI may schedule a downlink transmission at a user equipment (UE), where the downlink transmission includes a downlink data message multiplexed with a second DCI (e.g., piggyback DCI). In some aspects, the first DCI may include resource allocations for both the downlink transmission and the second DCI. The respective resource allocations may be indicated as: (1) explicit quantities of resource elements/resource blocks, (2) resource element densities (e.g., quantity of resource elements per resource block) in conjunction with a quantity of symbols and/or resource blocks, (3) starting and ending symbols, or any combination thereof. The UE may then determine a quantity of resource elements allocated for the downlink data message based on the first and second resource allocations. Subsequently, the UE may determine the TBS for the downlink data message based on the quantity of resource elements allocated for the downlink data message, and may decode the downlink transmission including the downlink data message based on the determined TBS.

A method of wireless communication at a UE is described. The method may include receiving, from a base station, first DCI scheduling a downlink transmission at the UE, the first DCI including an indication of a first resource allocation for the downlink transmission, determining that the downlink transmission includes a downlink data message multiplexed with second DCI, receiving, from the base station, an indication of a second resource allocation for the second DCI, determining a TBS of the downlink data message based on the first resource allocation for the downlink transmission and the second resource allocation for the second DCI, and processing the downlink transmission based on the TBS of the downlink data message.

An apparatus for wireless communication at a UE is described. The apparatus may include a processor, memory coupled with the processor, and instructions stored in the memory. The instructions may be executable by the processor to cause the apparatus to receive, from a base station, first DCI scheduling a downlink transmission at the UE, the first DCI including an indication of a first resource allocation for the downlink transmission, determine that the downlink transmission includes a downlink data message multiplexed with second DCI, receive, from the base station, an indication of a second resource allocation for the second DCI, determine a TBS of the downlink data message based on the first resource allocation for the downlink transmission and the second resource allocation for the second DCI, and process the downlink transmission based on the TBS of the downlink data message.

Another apparatus for wireless communication at a UE is described. The apparatus may include means for receiving, from a base station, first DCI scheduling a downlink transmission at the UE, the first DCI including an indication of a first resource allocation for the downlink transmission, determining that the downlink transmission includes a downlink data message multiplexed with second DCI, receiving, from the base station, an indication of a second resource allocation for the second DCI, determining a TBS of the downlink data message based on the first resource allocation for the downlink transmission and the second resource allocation for the second DCI, and processing the downlink transmission based on the TBS of the downlink data message.

A non-transitory computer-readable medium storing code for wireless communication at a UE is described. The code may include instructions executable by a processor to receive, from a base station, first DCI scheduling a downlink transmission at the UE, the first DCI including an indication of a first resource allocation for the downlink transmission, determine that the downlink transmission includes a downlink data message multiplexed with second DCI, receive, from the base station, an indication of a second resource allocation for the second DCI, determine a TBS of the downlink data message based on the first resource allocation for the downlink transmission and the second resource allocation for the second DCI, and process the downlink transmission based on the TBS of the downlink data message.

Some examples of the method, apparatuses, and non-transitory computer-readable medium described herein may further include operations, features, means, or instructions for determining a resource element density associated with the second DCI based on the second resource allocation, where determining the TBS of the downlink data message may be based on the resource element density associated with the second DCI.

Some examples of the method, apparatuses, and non-transitory computer-readable medium described herein may further include operations, features, means, or instructions for receiving, from the base station, an indication of a quantity of symbols allocated for the second DCI, and determining a quantity of resource elements allocated for the second DCI based on the resource element density and the quantity of symbols allocated for the second DCI, where determining the TBS may be based on the quantity of symbols allocated for the second DCI.

In some examples of the method, apparatuses, and non-transitory computer-readable medium described herein, the resource element density includes a quantity of resource elements per resource block allocated for the second DCI.

In some examples of the method, apparatuses, and non-transitory computer-readable medium described herein, the second resource allocation includes an indication of a quantity of resource elements allocated for the second DCI, where determining the TBS may be based on the quantity of resource elements allocated for the second DCI.

In some examples of the method, apparatuses, and non-transitory computer-readable medium described herein, the indication of the second resource allocation for the second DCI may be received via the first DCI.

Some examples of the method, apparatuses, and non-transitory computer-readable medium described herein may further include operations, features, means, or instructions for receiving, via a first bit field of the first DCI, an indication that the downlink transmission includes the downlink data message, and receiving, via a second bit field of the first DCI, an indication that the downlink transmission includes the second DCI, where determining that the downlink transmission includes the downlink data message multiplexed with the second DCI may be based on the first bit field and the second bit field.

In some examples of the method, apparatuses, and non-transitory computer-readable medium described herein, determining the TBS further may include operations, features, means, or instructions for determining a third resource allocation for the downlink data message based on the first resource allocation for the downlink transmission and the second resource allocation for the second DCI, where the TBS may be based on the third resource allocation.

In some examples of the method, apparatuses, and non-transitory computer-readable medium described herein, determining the third resource allocation for the downlink data message may include operations, features, means, or instructions for determining a first quantity of resource elements allocated for the downlink transmission based on the first resource allocation, determining a second quantity of resource elements allocated for the second DCI based on the second resource allocation, and determining a third quantity of resource elements allocated for the downlink data message based on the first quantity of resource elements and the second quantity of resource elements, where the TBS may be based on the third quantity of resource elements.

Some examples of the method, apparatuses, and non-transitory computer-readable medium described herein may further include operations, features, means, or instructions for receiving, from the base station, an indication of a modulation and coding scheme (MCS) associated with the downlink transmission, a quantity of layers associated with the downlink transmission, a quantity of codewords associated with the downlink transmissions, or any combination thereof, where determining the TBS may be based on the third quantity of resource elements and the MCS, the quantity of layers, the quantity of codewords, or any combination thereof.

A method of wireless communication at a base station is described. The method may include transmitting, to the UE, first DCI scheduling a downlink transmission at the UE, the first DCI including an indication of a first resource allocation for the downlink transmission, determining that the downlink transmission includes a downlink data message multiplexed with second DCI, transmitting, to the UE, an indication of a second resource allocation for the second DCI, determining a TBS of the downlink data message based on the first resource allocation for the downlink transmission and the second resource allocation for the second DCI, and transmitting, to the UE, the downlink transmission based on the TBS of the downlink data message.

An apparatus for wireless communication at a base station is described. The apparatus may include a processor, memory coupled with the processor, and instructions stored in the memory. The instructions may be executable by the processor to cause the apparatus to transmit, to the UE, first DCI scheduling a downlink transmission at the UE, the first DCI including an indication of a first resource allocation for the downlink transmission, determine that the downlink transmission includes a downlink data message multiplexed with second DCI, transmit, to the UE, an indication of a second resource allocation for the second DCI, determine a TBS of the downlink data message based on the first resource allocation for the downlink transmission and the second resource allocation for the second DCI, and transmit, to the UE, the downlink transmission based on the TBS of the downlink data message.

Another apparatus for wireless communication at a base station is described. The apparatus may include means for transmitting, to the UE, first DCI scheduling a downlink transmission at the UE, the first DCI including an indication of a first resource allocation for the downlink transmission, determining that the downlink transmission includes a downlink data message multiplexed with second DCI, transmitting, to the UE, an indication of a second resource allocation for the second DCI, determining a TBS of the downlink data message based on the first resource allocation for the downlink transmission and the second resource allocation for the second DCI, and transmitting, to the UE, the downlink transmission based on the TBS of the downlink data message.

A non-transitory computer-readable medium storing code for wireless communication at a base station is described. The code may include instructions executable by a processor to transmit, to the UE, first DCI scheduling a downlink transmission at the UE, the first DCI including an indication of a first resource allocation for the downlink transmission, determine that the downlink transmission includes a downlink data message multiplexed with second DCI, transmit, to the UE, an indication of a second resource allocation for the second DCI, determine a TBS of the downlink data message based on the first resource allocation for the downlink transmission and the second resource allocation for the second DCI, and transmit, to the UE, the downlink transmission based on the TBS of the downlink data message.

Some examples of the method, apparatuses, and non-transitory computer-readable medium described herein may further include operations, features, means, or instructions for determining a resource element density associated with the second DCI based on the second resource allocation, where determining the TBS of the downlink data message may be based on the resource element density associated with the second DCI.

Some examples of the method, apparatuses, and non-transitory computer-readable medium described herein may further include operations, features, means, or instructions for transmitting, to the UE, an indication of a quantity of symbols allocated for the second DCI, and determining a quantity of resource elements allocated for the second DCI based on the resource element density and the quantity of symbols allocated for the second DCI, where determining the TBS may be based on the quantity of symbols allocated for the second DCI.

In some examples of the method, apparatuses, and non-transitory computer-readable medium described herein, the resource element density includes a quantity of resource elements per resource block allocated for the second DCI.

In some examples of the method, apparatuses, and non-transitory computer-readable medium described herein, the second resource allocation includes an indication of a quantity of resource elements allocated for the second DCI, where determining the TBS may be based on the quantity of resource elements allocated for the second DCI.

In some examples of the method, apparatuses, and non-transitory computer-readable medium described herein, the indication of the second resource allocation for the second DCI may be transmitted via the first DCI.

Some examples of the method, apparatuses, and non-transitory computer-readable medium described herein may further include operations, features, means, or instructions for transmitting, via a first bit field of the first DCI, an indication that the downlink transmission includes the downlink data message, and transmitting, via a second bit field of the first DCI, an indication that the downlink transmission includes the second DCI, where determining that the downlink transmission includes the downlink data message multiplexed with the second DCI may be based on the first bit field and the second bit field.

In some examples of the method, apparatuses, and non-transitory computer-readable medium described herein, determining the TBS further may include operations, features, means, or instructions for determining a third resource allocation for the downlink data message based on the first resource allocation for the downlink transmission and the second resource allocation for the second DCI, where the TBS may be based on the third resource allocation.

In some examples of the method, apparatuses, and non-transitory computer-readable medium described herein, determining the third resource allocation for the downlink data message may include operations, features, means, or instructions for determining a first quantity of resource elements allocated for the downlink transmission based on the first resource allocation, determining a second quantity of resource elements allocated for the second DCI based on the second resource allocation, and determining a third quantity of resource elements allocated for the downlink data message based on the first quantity of resource elements and the second quantity of resource elements, where the TBS may be based on the third quantity of resource elements.

Some examples of the method, apparatuses, and non-transitory computer-readable medium described herein may further include operations, features, means, or instructions for transmitting, to the UE, an indication of an MCS associated with the downlink transmission, a quantity of layers associated with the downlink transmission, a quantity of codewords associated with the downlink transmissions, or any combination thereof, where determining the TBS may be based on the third quantity of resource elements and the MCS, the quantity of layers, the quantity of codewords, or any combination thereof.

DETAILED DESCRIPTION

Figure 1:
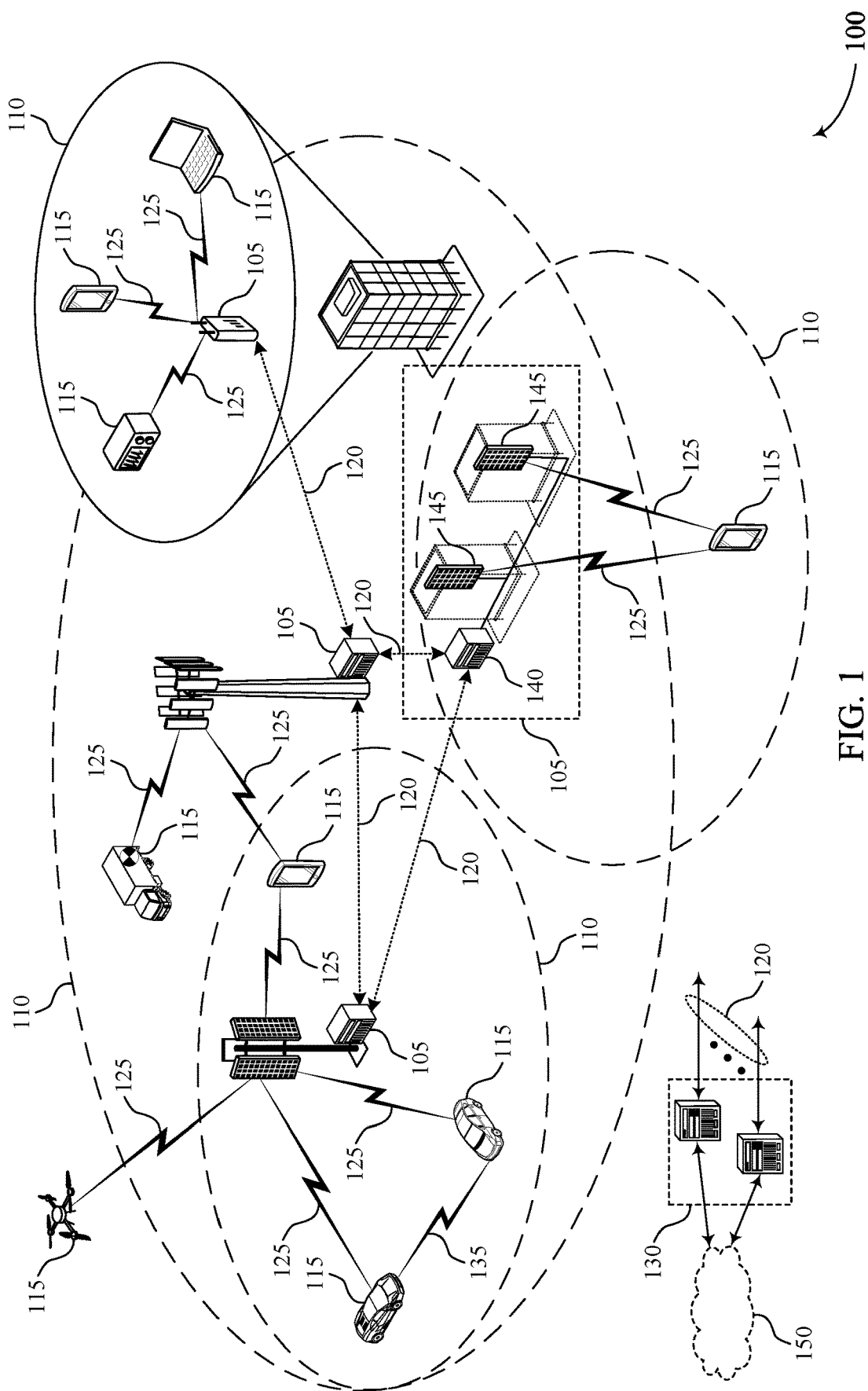
FIG. 1 illustrates an example of a wireless communications system that supports transport block size (TBS) determination for downlink transmissions including multiplexed downlink control information (DCI) in accordance with aspects of the present disclosure.

In some wireless communications systems, downlink transmissions (e.g., physical downlink shared channel (PDSCH) transmissions) may be scheduled at a user equipment (UE) by downlink control information (DCI) transmitted from a base station. The DCI may be received via control resource sets (CORESETs) which may be blindly decoded by the UE. In high-frequency bands, slot duration may decrease and the number of slots per subframe may increase. This may correspondingly increase a quantity of CORESETs that the UE may monitor and blindly decode for DCI received via the respective CORESETs. Increased search space monitoring, in conjunction with increased blind decoding, may result in excessive computational complexity and cost, as well as increased power consumption at the UE.

One solution which has been proposed to address issues associated with increased blind decoding in high bands is the concept of "piggyback" DCI. With piggyback DCI, scheduled downlink transmissions (e.g., PDSCH transmissions) may be formatted to include downlink data messages (e.g., downlink data within a transport block) multiplexed with additional DCI (e.g., piggyback DCI). However, the presence of piggyback DCI may reduce the quantity of resource elements within the downlink transmission which are allocated for the downlink data messages. In this regard, the presence of the piggyback DCI may result in an increased code rate which exceeds a desired code rate for the downlink transmission, thereby adversely affecting the reliability of transport block decoding of the downlink data messages at the UE.

To address issues associated with transport block decoding in the presence of piggyback DCI, techniques for determining a transport block size (TBS) of downlink data multiplexed with piggyback DCI are disclosed. In some aspects, a UE may receive a first DCI scheduling a downlink transmission at the UE. In cases where the downlink transmission includes a downlink data message (e.g., DL-SCH transmission) multiplexed with a second DCI (e.g., piggyback DCI), the first DCI may also indicate a first resource allocation for the downlink transmission and a second resource allocation for the second DCI. The respective resource allocations may be indicated as: (1) explicit quantities of resource elements/resource blocks, (2) resource element densities (e.g., quantity of resource elements per resource block) in conjunction with a quantity of symbols and/or resource blocks, (3) starting and ending symbols, or any combination thereof. The UE may then determine a quantity of resource elements allocated for the downlink data message based on the first and second resource allocations. Subsequently, the UE may determine the TBS for the downlink data message based on the quantity of resource elements allocated for the downlink data message, and may decode the downlink transmission including the downlink data message based on the determined TBS.

Aspects of the disclosure are initially described in the context of wireless communications systems. Aspects of the disclosure are additionally described in the context of an example process flow. Aspects of the disclosure are further illustrated by and described with reference to apparatus diagrams, system diagrams, and flowcharts that relate to TBS determination for downlink transmissions including multiplexed DCI.

FIG. 1 illustrates an example of a wireless communications system 100 that supports TBS determination for downlink transmissions including multiplexed DCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for determining a TBS of a downlink data message in the presence of piggyback DCI. In particular, techniques described herein may enable a UE 115 to determine a TBS for a downlink data message multiplexed with a DCI (e.g., piggyback DCI) within a single downlink transmission such that the UE 115 may decode the downlink transmission based on the determined TBS. By enabling accurate TBS determination in the presence of piggyback DCI, techniques described herein may enable efficient use of piggyback DCI within downlink transmissions, thereby improving transport block decoding and reducing control signaling overhead within the wireless communications system 100.

For example, in some aspects, a base station 105 of the wireless communications system 100 may transmit a first DCI message to a UE 115. The first DCI may schedule a downlink transmission at the UE 115, where the downlink transmission includes a downlink data message (e.g., DL-SCH transmission) multiplexed with a second DCI (e.g., piggyback DCI). In some aspects, the first DCI may also indicate a first resource allocation for the downlink transmission and a second resource allocation for the second DCI. The respective resource allocations may be indicated as: (1) explicit quantities of resource elements, or (2) resource element densities (e.g., quantity of resource elements per resource block) in conjunction with a quantity of symbols and/or resource blocks.

In some aspects, the UE may determine a third resource allocation associated with the downlink data message based on the first resource allocation and the second resource allocation. In this regard, the UE may determine a quantity of resource elements allocated for the downlink data message based on the first and second resource allocations. Subsequently, the UE may determine the TBS for the downlink data message based on the quantity of resource elements allocated for the downlink data message, and may decode the downlink transmission including the downlink data message based on the determined TBS.

Techniques described herein may support downlink transmissions including downlink data messages multiplexed with DCI (e.g., piggyback DCI) while reducing or eliminating adverse effects associated with transport block decoding at the UE 115. In particular, by enabling the UE 115 to accurately and efficiently determine a TBS associated with the downlink data message, techniques described herein may enable efficient and reliable transport block decoding of the downlink data messages at the UE 115, thereby leading to improved wireless communications. Moreover, by enabling accurate TBS determination, techniques described herein may enable efficient use of piggyback DCI within downlink transmissions, thereby reducing control signaling overhead within the wireless communications system 100.

Figure 2:
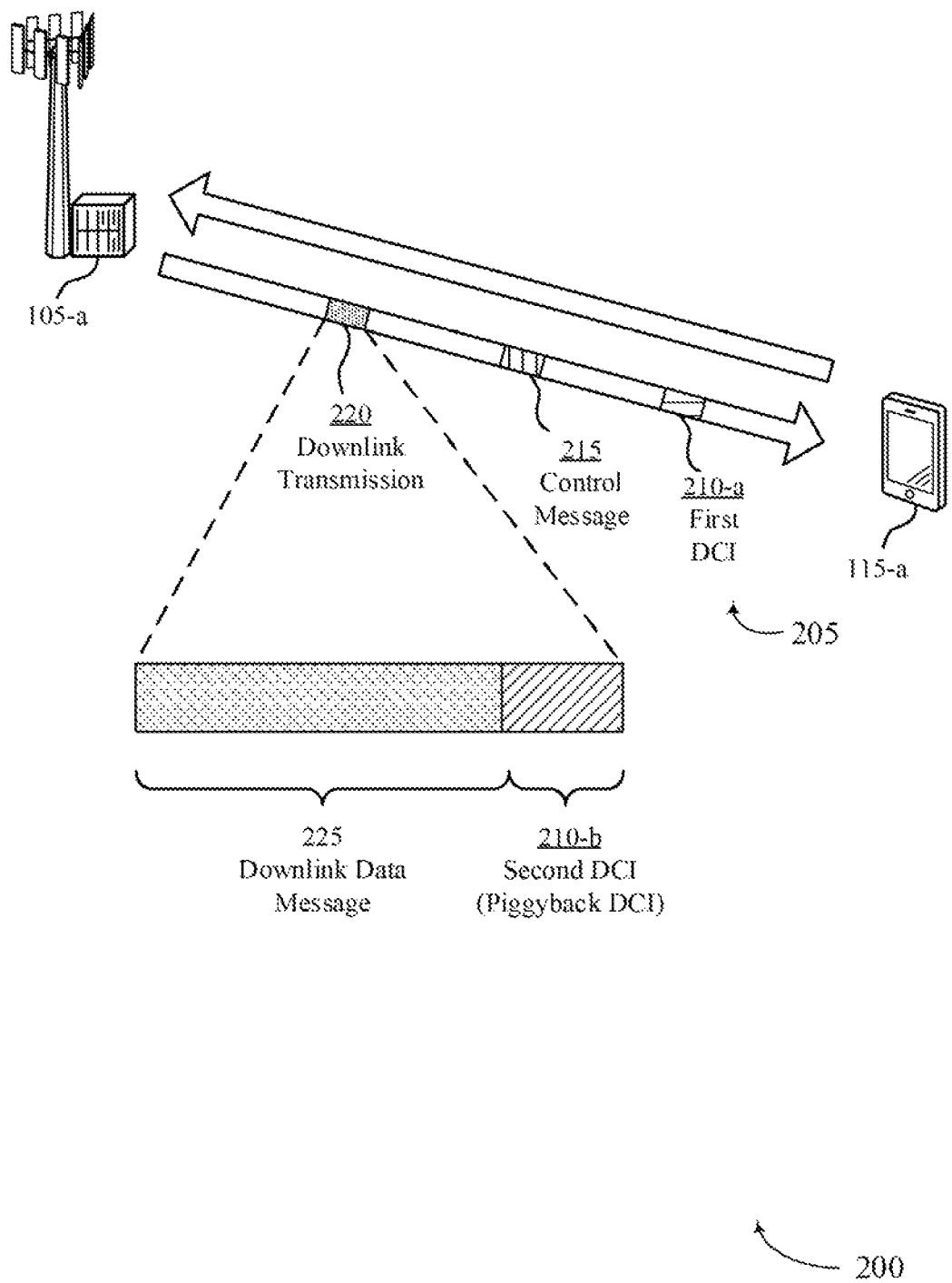
FIG. 2 illustrates an example of a wireless communications system that supports TBS determination for downlink transmissions including multiplexed DCI in accordance with aspects of the present disclosure.

FIG. 2 illustrates an example of a wireless communications system 200 that supports TBS determination for downlink transmissions including multiplexed DCI in accordance with aspects of the present disclosure. In some examples, wireless communications system 200 may implement aspects of wireless communications system 100. The wireless communications system 200 may include a base station 105-a and a UE 115-a, which may be examples of UEs 115 and base stations 105, as described with reference to FIG. 1.

The UE 115-a may communicate with the base station 105-a using a communication link 205. In some cases, the communication link 205 may include an example of an access link (e.g., a Uu link). The communication link 205 may include a bi-directional link that can include both uplink and downlink communication. In one aspect, the UE 115-a may transmit uplink transmissions, such as uplink messages or uplink signals, to the base station 105-a using the communication link 205 and the base station 105-a may transmit downlink data transmissions, such as downlink messages or downlink signals, to the UE 115-a using the communication link 205.

In some aspects, the UE 115-a and the base station 105-a of the wireless communications system 200 may support techniques for determining a TBS of a downlink data message in the presence of piggyback DCI. In particular, techniques described herein may enable the UE 115-a and/or the base station 105-a to determine a TBS for a downlink data message multiplexed with a DCI (e.g., piggyback DCI) within a single downlink transmission such that the UE 115-a may decode the downlink data message 225 based on the determined TBS. By enabling accurate TBS determination in the context of piggyback DCI, techniques described herein may enable efficient use of piggyback DCI within downlink transmissions, thereby improving transport block decoding and reducing control signaling overhead within the wireless communications system 200.

For example, the base station 105-a may transmit a first DCI 210-a to the UE 115-a. In some aspects, the first DCI 210-a may schedule a downlink transmission 220 at the UE 115-a. In some aspects, the downlink transmission 220 may include a downlink data message 225 (e.g., DL-SCH transmission) which is multiplexed with a second DCI 210-b (e.g., piggyback DCI 210-b). In this regard, the downlink transmission 220 may include downlink data (e.g., downlink data message 225) within a transport block of the downlink transmission 220, where the downlink data within the transport block is multiplexed with the second DCI 210-b.

In some cases, the first DCI 210-a may include an indication of a first resource allocation for the downlink transmission 220. The first resource allocation may include a set of time resources and a set of frequency resources allocated for the downlink transmission 220. Additionally or alternatively, the first resource allocation may include an indication of one or more parameters associated with the downlink transmission 220 including, but not limited to, a quantity of resource elements allocated for the downlink transmission 220, a quantity of resource blocks or symbols allocated for the downlink transmission 220, starting and ending symbols of the downlink transmission 220, a resource element density associated with the downlink transmission 220, or any combination thereof.

In some aspects, the first DCI 210-a may additionally or alternatively include an indication of a second resource allocation associated with the second DCI 210-b. The second resource allocation may include a set of time resources and a set of frequency resources allocated for the second DCI 210-b. Additionally or alternatively, the second resource allocation may include an indication of one or more parameters associated with the second DCI 210-b including, but not limited to, a quantity of resource elements allocated for the second DCI 210-b, a quantity of resource blocks or symbols allocated for the second DCI 210-b, a resource element density associated with the second DCI 210-b, or any combination thereof.

In some aspects, the first DCI 210-a may indicate, to the UE 115-a, that the downlink transmission 220 scheduled by the first DCI 210-a includes both the downlink data message 225 and the second DCI 210-b (e.g., includes the downlink data message 225 multiplexed with the second DCI 210-b). For example, in some cases, the first DCI 210-a may include one or more bit fields which indicate that the downlink transmission 220 scheduled by the first DCI 210-a includes the downlink data message 225, the second DCI 210-b, or both.

For instance, the base station 105-a may transmit, via a first bit field of the first DCI 210-a, an indication that the downlink transmission 220 includes a downlink data message 225. In particular, a first value of the first bit field may indicate that the downlink transmission 220 includes a downlink data message 225, while a second value of the first bit field may indicate that the downlink transmission 220 does not include a downlink data message 225. Continuing with the same example, the base station 105-a may transmit, via a second bit field of the first DCI 210-a, that the downlink transmission 220 includes a second DCI 210-b. Similarly, a first value of the second bit field may indicate that the downlink transmission 220 includes a second DCI 210-b, while a second value of the second bit field may indicate that the downlink transmission 220 does not include a second DCI 210-b.

In cases where the first DCI 210-a indicates an absence of the second DCI 210-b (e.g., second value of the second bit field indicating that the downlink transmission 220 does not include the second DCI 210-*b*), the resources (e.g., second resource allocation) which would otherwise be allocated for the second DCI 210-*b* may be allocated to the downlink data transmission 225 (e.g., transport block), such as to increase repetition or incremental redundancy. Conversely, in cases where the first DCI 210-*a* indicates an absence of the downlink data message 225 (e.g., second value of the first bit field indicating that the downlink transmission 220 does not include the downlink data message 225), the resources which would otherwise be allocated for the downlink data message 225 may be allocated to the second DCI 210-*b*, such as to increase repetition or incremental redundancy.

In some aspects, the UE 115-*a*, the base station 105-*a*, or both, may determine that the downlink transmission 220 scheduled by the first DCI 210-*a* includes the downlink data message 225 and the second DCI 210-*b*. In particular, the UE 115-*a*, the base station 105-*a*, or both, may determine that the downlink transmission 220 includes the downlink data message 225 multiplexed with the second DCI 210-*b*.

In some aspects, the UE 115-*a* and/or the base station 105-*a* may determine that the downlink transmission 220 includes a downlink data message 225 multiplexed with the second DCI 210-*b* based on the first DCI 210-*a*. For example, in cases where the first DCI 210-*a* includes one or more bit fields indicating that the downlink transmission 220 includes a downlink data message 225, a second DCI, or both, the UE 115-*a* may determine that the downlink transmission 220 includes the downlink data message 225 multiplexed with the second DCI 210-*b* based on the one or more bit fields of the first DCI 210-*a*. For instance, the UE 115-*a* may determine that the downlink transmission 220 includes a downlink data message 225 based on a value (e.g., first value) of a first bit field of the first DCI 210-*a*, and may determine that the downlink transmission 220 includes a second DCI 210-*b* based on a value (e.g., first value) of a second bit field of the first DCI 210-*b*.

In some cases, the first DCI 210-*a* may not include an indication of the second resource allocation associated with the second DCI 210-*b*. In such cases, the base station 105-*a* may transmit a control message 215 (or other downlink message) to the UE 115-*a*, where the control message 215 includes an indication of the second resource allocation for the second DCI 210-*b*. In some aspects, the base station 105-*a* may transmit the control message 215 including the indication of the second resource allocation for the second DCI 210-*b* based on transmitting the first DCI 210-*a*, determining the downlink transmission 220 includes the downlink data message 225 multiplexed with the second DCI 210-*b*, or both.

In some cases, as noted previously herein, the first DCI 210-*a* may include an indication of the second resource allocation for the second DCI 210-*b*. In such cases, it may be unnecessary to transmit a separate indication of the second resource allocation via the control message 215. In this regard, the base station 105-*a* may refrain from transmitting the control message 215 including the indication of the second resource allocation in cases where the second resource allocation is indicated via the first DCI 210-*a*.

Additionally or alternatively, the base station 105-*a* may transmit, to the UE 115-*a*, an indication of one or more parameters associated with the downlink transmission 220. For example, the base station 105-*a* may transmit an indication of one or more parameters associated with the downlink transmission 220 via the control message 215, the first DCI 210-*a*, or both. The one or more parameters associated with the downlink transmission 220 may include, but are not limited to, a modulation and coding scheme (MCS) of the downlink transmission 220, a quantity of layers associated with the downlink transmission 220, a quantity of codewords associated with the downlink transmission 220, or any combination thereof. The base station 105-*a* may transmit the indication of the one or more parameters based on transmitting the first DCI 210-*a*, determining the downlink transmission 220 includes the downlink data message 225 multiplexed with the second DCI 210-*b*, transmitting the control message 215 including the indication of the second resource allocation, or any combination thereof. Moreover, in some cases, the one or more parameters associated with the downlink transmission 220 may be transmitted, to the UE 115-*a*, via the first DCI 210-*a*.

In some aspects, the UE 115-*a*, the base station 105-*a*, or both, may determine a resource element density associated with the second DCI 210-*b*, a quantity of resource elements allocated for the second DCI 210-*b*, or both. In some aspects, the UE 115-*a* and/or the base station 105-*a* may determine the resource element density and/or the quantity of resource elements allocated for the second DCI 210-*b* based on receiving the first DCI 210-*a*, determining the downlink transmission 220 includes the downlink data message 225 multiplexed with the second DCI 210-*b*, receiving the control message 215 indicating the second resource allocation for the second DCI 210-*b*, receiving the one or more parameters (e.g., MCS, quantity of layers, quantity of codewords) for the downlink transmission 220, or any combination thereof.

For example, the UE 115-*a* may determine the resource element density and/or the quantity of resource elements allocated for the second DCI 210-*b* based on the second resource allocation for the second DCI 210-*b*. For instance, the second resource allocation may include an indication of a resource element density associated with the second DCI 210-*b* In such cases, the UE 115-*a* may determine the resource element density for the second DCI 210-*b*. based on the second resource allocation. In some aspects, the resource element density associated with the second DCI 210-*a* may include a quantity of resource elements per resource block and/or symbol allocated for the second DCI 210-*b*.

Moreover, the UE 115-*a* may determine a quantity of resource elements allocated for the second DCI 210-*b*. For example, in addition to transmitting an indication of the resource element density for the second DCI 210-*b*, the base station 105-*a* may transmit (e.g., via the first DCI 210-*a*) an indication of a quantity of symbols (e.g., quantity of resource blocks) allocated for the second DCI 210-*b*. In this example, the UE 115-*a* may determine a quantity of resource elements allocated for the second DCI 210-*b* based on the indication of the resource element density for the second DCI 210-*b* and the quantity of symbols allocated for the second DCI 210-*b*.

In some aspects, the UE 115-*a*, the base station 105-*a*, or both, may determine a third resource allocation associated with the downlink data message 225. The third resource allocation may include a set of time resources and a set of frequency resources allocated for the downlink data message 225. Additionally or alternatively, the third resource allocation may include an indication of one or more parameters associated with the downlink data message 225 including, but not limited to, a quantity of resource elements allocated for the downlink data message 225, a resource element density associated with the downlink data message 225, or both.

In some aspects, the UE 115-*a* and/or the base station 105-*a* may determine the third resource allocation for the downlink data message 225 based on the first DCI 210-*a*, determining the downlink transmission 220 includes the downlink data message 225 multiplexed with the second DCI 210-b, the first and second resource allocations, the one or more parameters for the downlink transmission 220, the resource element density and/or quantity of resource elements allocated for the second DCI 210-b, or any combination thereof.

For example, in cases where the UE 115-a determines the resource element density associated with the second DCI 210-a, the UE 115-b may additionally determine a resource element density for the downlink data message 225 according to Equation 1 below:

$$N'_{RE} = N_{SC}^{RB} * N_{symb}^{sh} - N_{Overhead}^{PRB} - N_{pbDCI}^{PRB} \quad (1)$$

where $N'_{RE}$ defines a quantity of resource elements per resource block over the symbols allocated for the downlink transmission 220, $N_{SC}^{RB}$ defines a quantity of subcarriers per symbol within the downlink transmission 220 (e.g., 12 subcarriers per symbol), $N_{symb}^{sh}$ defines the quantity of symbols for the downlink transmission 220, $N_{Overhead}^{PRB}$ defines the resource element density for demodulation reference signals (DMRS) and other overhead within the downlink transmission 220, and $N_{pbDCI}^{PRB}$ defines the resource element density for the second DCI 210-b (e.g., second resource allocation) multiplied by the quantity of symbols of the second DCI 210-b.

As noted previously herein, terms illustrated in Equation 1 (e.g., $N_{pbDCI}^{PRB}$, $N_{symb}^{sh}$, $N_{Overhead}^{PRB}$) may be indicated to the UE 115-a via the first DCI 210-a and/or higher level signaling, thereby enabling the UE 115-a to determine $N'_{RE}$, a resource element density associated with the downlink data message 225. In this regard, the UE 115-a may determine the third resource allocation (e.g., $N'_{RE}$) associated with the downlink data message 225 based on the first resource allocation and the second resource allocation.

Additionally or alternatively, the UE 115-a may determine the third resource allocation for the downlink data message 225 by determining quantities of resource elements allocated for the downlink transmission 220, the second DCI 210-b, and the downlink data message 225. For instance, in some cases, the first DCI 210-a may include an indication of a first quantity of resource elements allocated for the downlink transmission 220 (e.g., $n_{PRB}$), a second quantity of resource elements allocated for the second DCI 210-b (e.g., $N_{pbDCI}$), or both. In this example, the UE 115-a may determine a first quantity of resource elements allocated for the for the downlink transmission 220 (e.g., $n_{PRB}$) based on the first resource allocation, and may determine a second quantity of resource elements allocated for the second DCI 210-b (e.g., $N_{pbDCI}$) based on the second resource allocation. Furthermore, the UE 115-a may determine a third quantity of resource elements allocated for the downlink data message 225 (e.g., $N_{RE}$) based on Equation 2 below:

$$N_{RE} = \min(156, N'_{RE}) * n_{PRB} - N_{Overhead} - N_{pbDCI} \quad (2)$$

where $N_{RE}$ defines the third quantity of resource elements allocated for the downlink data message 225, $N'_{RE}$ defines the resource element density for the downlink data message 225 (as defined by Equation 1), $n_{PRB}$ defines the first quantity of resource blocks allocated for the downlink transmission 220, $N_{Overhead}$ defines a quantity of resource elements allocated for DMRS and other overhead within the downlink transmission 220, and $N_{pbDCI}$ defines the second quantity of resource elements allocated for the second DCI 210-b.

When piggyback DCI (e.g., second DCI 210-b) is present within a downlink transmission 220, the presence of the piggyback DCI may be accounted for in Equation 1 or Equation 2. In this regard, in some cases, the $N_{pbDCI}^{PRB}$ term in Equation 1, the $N_{pbDCI}$ term in Equation 2, or both, may be omitted such that the piggyback DCI is not taken into account more than once. Additionally, when the downlink transmission 220 does not include piggyback DCI (e.g., second DCI 210-b), both the the $N_{pbDCI}^{PRB}$ term in Equation 1 and the $N_{pbDCI}$ term in Equation 2 may be omitted.

As noted previously herein, terms illustrated in Equation 2 (e.g., $N_{pbDCI}$, $n_{PRB}$, $N_{Overhead}$) may be indicated to the UE 115-a via the first DCI 210-a, thereby enabling the UE 115-a to determine $N_{RE}$, the quantity of resource elements allocated for the downlink data message 225. In this regard, the UE 115-a may determine the third resource allocation (e.g., $N_{RE}$) associated with the downlink data message 225 based on the first resource allocation and the second resource allocation. In particular, as illustrated in Equation 2, the UE 115-a may determine a quantity of resource elements allocated for the downlink data message 225 (e.g., $N_{RE}$) by subtracting the second quantity of resource elements allocated for the second DCI 210-b (e.g., $N_{pbDCI}$) and/or additional quantities of resource elements (e.g., $N_{Overhead}$) from the first quantity of resource elements allocated for the downlink transmission 220 (e.g., $n_{PRB}$).

In some aspects, the UE 115-a, the base station 105-a, or both, may determine a TBS for the downlink data message 225. In this regard, the UE 115-a and/or the base station 105-a may determine the TBS for the transport block including the downlink data message 225. In some aspects, the UE 115-a and/or the base station 105-a may determine the TBS based on the first DCI 210-a, determining the downlink transmission 220 includes the downlink data message 225 multiplexed with the second DCI 210-b, the first, second, and third resource allocations, the one or more parameters for the downlink transmission 220, or any combination thereof.

For example, the UE 115-a and/or the base station 105-a may determine the TBS of the downlink data message 225 based on the first resource allocation for the downlink transmission 220 (e.g., resource element density associated with the downlink transmission 220, quantity of resource elements/resource blocks/symbols allocated for the downlink transmission 220, starting and ending symbols for the downlink transmission 220) and the second resource allocation for the second DCI 210-b (e.g., resource element density associated with the second DCI 210-b, quantity of resource elements/resource blocks/symbols allocated for the second DCI 210-b, starting and ending symbols for the second DCI 210-b). For instance, as noted previously herein, the UE 115-a and/or the base station 105-a may determine the third resource allocation for the downlink data message 225 based on the first resource allocation and the second resource allocation. The third resource allocation may include a resource element density associated with the downlink data message 225, a quantity of resource elements allocated for the downlink data message 225, or both. In this example, the UE 115-a and/or the base station 105-a may determine the TBS for the downlink data message 225 based on the third resource allocation (e.g., resource element density, third quantity of resource elements) associated with the downlink data message 225.

Additionally or alternatively, the UE 115-a and/or the base station 105-a may determine the TBS associated with the downlink data message 225 based on the one or more parameters associated with the downlink transmission 220 transmitted via the control message 215. For example, the UE 115-a may receive, via the control message 215 and/or the first DCI 210-*a*, an indication of an MCS associated with the downlink transmission 220, an indication of a quantity of layers associated with the downlink transmission 220, a quantity of codewords associated with the downlink transmission 220, or any combination thereof. In this example, the UE 115-*a* may determine the TBS associated with the downlink data message 225 based on the MCS, the quantity of layers, the quantity of codewords, or any combination thereof.

In some aspects, the base station 105-*a* may transmit the downlink transmission 220 to the UE 115-*a*, where the downlink transmission 220 includes the downlink data message 225 multiplexed with the second DCI 210-*b*. In some aspects, the base station 105-*a* may transmit the downlink transmission 220 based on the TBS of the downlink data message 225. Additionally or alternatively, the base station 105-*a* may transmit the downlink transmission 220 based on the first DCI 210-*a*, determining the downlink transmission 220 includes the downlink data message 225 multiplexed with the second DCI 210-*b*, the first, second, and third resource allocations, the one or more parameters for the downlink transmission 220, or any combination thereof.

Upon receiving the downlink transmission 220 from the base station 105-*a*, the UE 115-*a* may process the downlink transmission 220. Processing the downlink transmission 220 may include decoding the downlink transmission 220 (e.g., decoding/interpreting the downlink data message 225, decoding/interpreting the second DCI 210-*b*). In some aspects, the UE 115-*a* may process the downlink transmission 220 based on the TBS of the downlink data message 225. Additionally or alternatively, the UE 115-*a* may process the downlink transmission 220 based on the first DCI 210-*a*, determining the downlink transmission 220 includes the downlink data message 225 multiplexed with the second DCI 210-*b*, the first, second, and third resource allocations, the one or more parameters for the downlink transmission 220, or any combination thereof.

Techniques described herein may support downlink transmissions including downlink data messages 225 multiplexed with DCI 210 (e.g., second DCI 210-*b*, piggyback DCI 210-*b*) while reducing or eliminating adverse effects associated with transport block decoding at the UE 115-*a*. In particular, by enabling the UE 115-*a* to accurately and efficiently determine a TBS associated with the downlink data message 225, techniques described herein may enable efficient and reliable transport block decoding of the downlink data messages 225 at the UE 115-*a*, thereby leading to improved wireless communications. Moreover, by enabling accurate TBS determination, techniques described herein may enable efficient use of piggyback DCI 210 within downlink transmissions 220, thereby reducing control signaling overhead within the wireless communications system 200.

Figure 3:
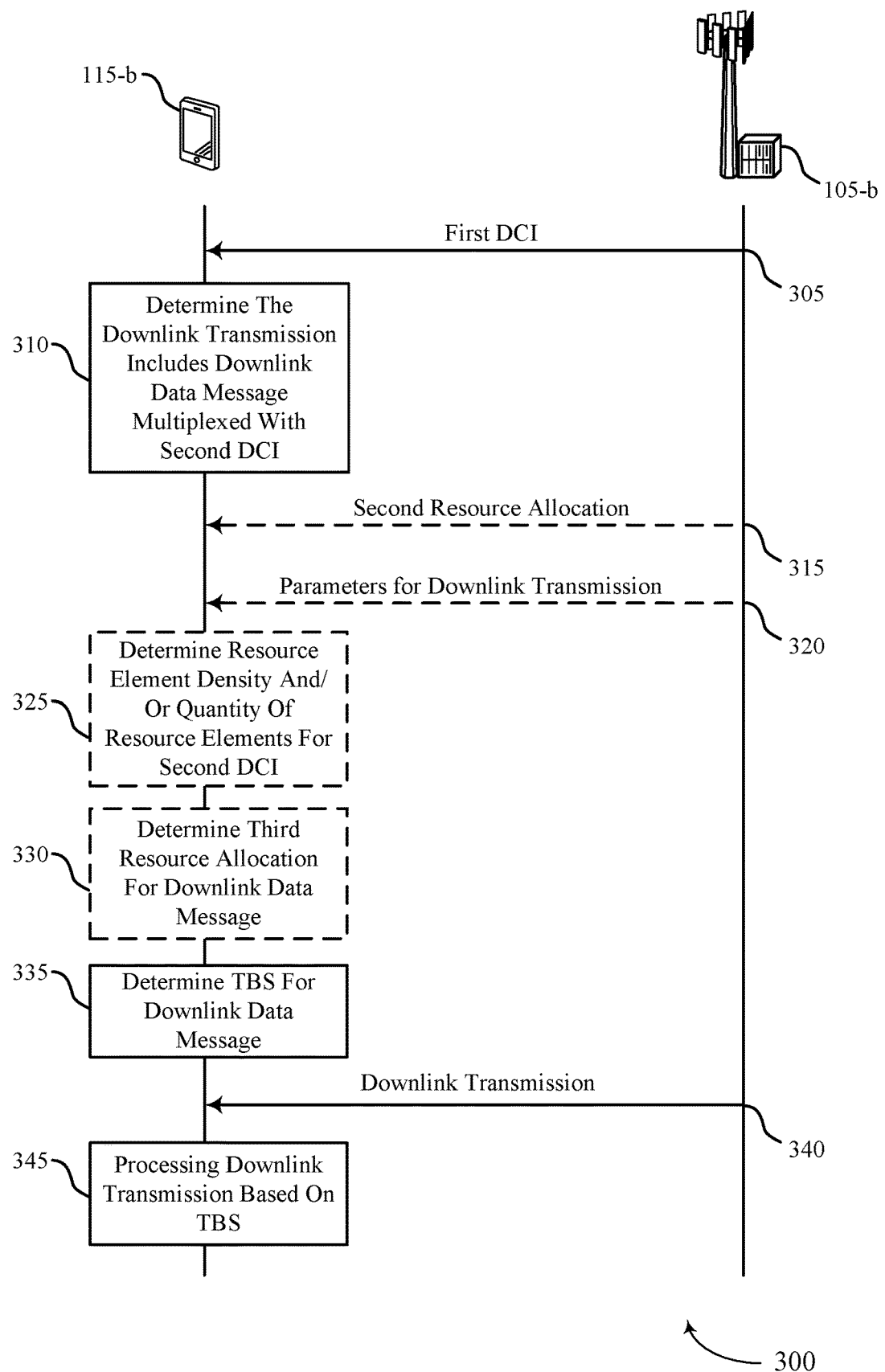
FIG. 3 illustrates an example of a process flow that supports TBS determination for downlink transmissions including multiplexed DCI in accordance with aspects of the present disclosure.

FIG. 3 illustrates an example of a process flow 300 that supports TBS determination for downlink transmissions including multiplexed DCI in accordance with aspects of the present disclosure. In some examples, process flow 300 may implement, or be implemented by aspects of wireless communications system 100 or 200. The process flow 300 may illustrate receiving a first DCI scheduling a downlink transmission, determining the downlink transmission includes a downlink data message multiplexed with a second DCI, determining a TBS for the downlink data message, and processing the downlink transmission based on the TBS, as described with reference to FIGS. 1-2, among other aspects.

In some aspects, process flow 300 may include a UE 115-*b* and a base station 105-*b* which may be examples of corresponding devices as described herein. The UE 115-*b* illustrated in FIG. 3 may be an example of the UE 115-*a* illustrated in FIG. 2. Similarly, the base station 105-*b* illustrated in FIG. 3 may be an example of the base station 105-*a* illustrated in FIG. 2.

In some aspects, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added. In particular, steps/features illustrated as being performed by the UE 115-*b* may be performed by the base station 105-*b*, and vice versa. For example, the steps/features illustrated as being performed by the UE 115-*b* at 310, 325, 330, and 335 may additionally or alternatively be performed by the base station 105-*b*.

At 305, the base station 105-*b* may transmit a first DCI to the UE 115-*b*. In some aspects, the first DCI may schedule a downlink transmission at the UE 115-*b*. In some aspects, the downlink transmission may include a downlink data message multiplexed with a second DCI (e.g., piggyback DCI). In some cases, the first DCI may include an indication of a first resource allocation for the downlink transmission. The first resource allocation may include a set of time resources and a set of frequency resources allocated for the downlink transmission. Additionally or alternatively, the first resource allocation may include an indication of one or more parameters associated with the downlink transmission including, but not limited to, a quantity of resource elements allocated for the downlink transmission, a resource element density associated with the downlink transmission, or both.

In some aspects, the first DCI may additionally or alternatively include an indication of a second resource allocation associated with the second DCI. The second resource allocation may include a set of time resources and a set of frequency resources allocated for the second DCI. Additionally or alternatively, the second resource allocation may include an indication of one or more parameters associated with the second DCI including, but not limited to, a quantity of resource elements allocated for the second DCI, a resource element density associated with the second DCI, or both.

In some aspects, the first DCI may indicate, to the UE 115-*b*, that the downlink transmission scheduled by the first DCI includes both the downlink data message and the second DCI (e.g., includes the downlink data message multiplexed with the second DCI). For example, in some cases, the first DCI may include one or more bit fields which indicate that the downlink transmission scheduled by the first DCI includes the downlink data message, the second DCI, or both. For instance, the base station 105-*b* may transmit, via a first bit field of the first DCI, an indication that the downlink transmission includes a downlink data message. Continuing with the same example, the base station 105-*b* may transmit, via a second bit field of the first DCI, that the downlink transmission includes a second DCI.

At 310, the UE 115-*b*, the base station 105-*b*, or both, may determine that the downlink transmission scheduled by the first DCI includes a downlink data message and a second DCI. In particular, the UE 115-*b*, the base station 105-*b*, or both, may determine that the downlink transmission includes a downlink data message multiplexed with a second DCI.

In some aspects, the UE 115-*b* and/or the base station 105-*b* may determine that the downlink transmission includes a downlink data message multiplexed with a second DCI based on the first DCI at 305. For example, in cases where the first DCI includes one or more bit fields indicating that the downlink transmission includes a downlink data message, a second DCI, or both, the UE 115-*b* may determine that the downlink transmission includes a downlink data message multiplexed with a second DCI based on the one or more bit fields of the first DCI. For instance, the UE 115-*b* may determine that the downlink transmission includes a downlink data message based on a value of a first bit field of the first DCI, and may determine that the downlink transmission includes a second DCI based on a value of a second bit field of the first DCI.

At 315, the base station 105-*b* may transmit, to the UE 115-*b*, an indication of a second resource allocation for the second DCI. The indication of the second resource allocation may be transmitted via a downlink control message. In some aspects, the base station 105-*b* may transmit the indication of the second resource allocation for the second DCI based on transmitting the first DCI at 305, determining the downlink transmission includes the downlink data message multiplexed with the second DCI at 310, or both.

In some cases, as noted previously herein, the first DCI may include an indication of the second resource allocation for the second DCI. In such cases, it may be unnecessary to transmit a separate indication of the second resource allocation, and the base station 105-*b* may refrain from transmitting the indication of the second resource allocation at 315. However, in other cases, the first DCI may not include an indication of the second resource allocation for the second DCI. In such cases, the base station 105-*b* may transmit the indication of the second resource allocation at 315.

At 320, the base station 105-*b* may transmit, to the UE 115-*b*, an indication of one or more parameters associated with the downlink transmission. The one or more parameters associated with the downlink transmission may include, but are not limited to, an MCS of the downlink transmission, a quantity of layers associated with the downlink transmission, a quantity of codewords associated with the downlink transmission, or any combination thereof. The base station 105-*b* may transmit the indication of the one or more parameters at 320 based on transmitting the first DCI at 305, determining the downlink transmission includes the downlink data message multiplexed with the second DCI at 310, transmitting the indication of the second resource allocation at 315, or any combination thereof.

In some aspects, the base station 105-*b* may transmit the indication of the one or more parameters associated with the downlink transmission in a separate downlink message, as shown in FIG. 3. However, in additional or alternative aspects, the base station 105-*b* may transmit the indication of the one or more parameters associated with the downlink transmission in the first DCI transmitted at 305, in the downlink message including the indication of the second resource allocation transmitted at 315, or both.

At 325, the UE 115-*b*, the base station 105-*b*, or both, may determine a resource element density associated with the second DCI, a quantity of resource elements allocated for the second DCI, or both. In some aspects, the UE 115-*b* and/or the base station 105-*b* may determine the resource element density and/or the quantity of resource elements allocated for the second DCI based on receiving the first DCI at 305, determining the downlink transmission includes the downlink data message multiplexed with the second DCI at 310, receiving the second resource allocation for the second DCI at 315, receiving the one or more parameters for the downlink transmission at 320, or any combination thereof.

For example, the UE 115-*b* may determine the resource element density and/or the quantity of resource elements allocated for the second DCI based on the second resource allocation for the second DCI. For instance, the second resource allocation may include an indication of the resource element density associated with the second DCI. In such cases, the UE 115-*a* may determine the resource element density for the second DCI based on the second resource allocation. In some aspects, the resource element density associated with the second DCI may include a quantity of resource elements per resource block and/or symbol allocated for the second DCI.

Moreover, the UE 115-*b* may determine a quantity of resource elements allocated for the second DCI. For example, in addition to transmitting an indication of the resource element density for the second DCI, the base station 105-*b* may transmit (e.g., via the first DCI) an indication of a quantity of symbols allocated for the second DCI. In this example, the UE 115-*b* may determine a quantity of resource elements allocated for the second DCI based on the indication of the resource element density for the second DCI and the quantity of symbols allocated for the second DCI.

At 330, the UE 115-*b* the base station 105-*b*, or both, may determine a third resource allocation associated with the downlink data message. The third resource allocation may include a set of time resources and a set of frequency resources allocated for the downlink data message. Additionally or alternatively, the third resource allocation may include an indication of one or more parameters associated with the downlink data message including, but not limited to, a quantity of resource elements allocated for the downlink data message, a resource element density associated with the downlink data message, or both.

In some aspects, the UE 115-*b* and/or the base station 105-*b* may determine the third resource allocation for the downlink data message based on transmitting/receiving the first DCI at 305, determining the downlink transmission includes the downlink data message multiplexed with the second DCI at 310, the second resource allocation for the second DCI at 315, transmitting/receiving the one or more parameters for the downlink transmission at 320, determining the resource element density and/or quantity of resource elements allocated for the second DCI at 325, or any combination thereof.

For example, in some cases, the UE 115-*b* may determine the third resource allocation for the downlink data message based on the first resource allocation for the downlink transmission and the second resource allocation for the second DCI. For instance, the UE 115-*b* may determine a first quantity of resource elements allocated for the for the downlink transmission based on the first resource allocation, and may determine a second quantity of resource elements allocated for the second DCI based on the second resource allocation. In this example, the UE 115-*b* may determine a third quantity of resource elements allocated for the downlink data message based on the first quantity of resource elements and the second quantity of resource elements. For instance, the UE 115-*b* may determine the third quantity of resource elements by subtracting the second quantity of resource elements allocated for the second DCI and/or additional quantities of resource elements (e.g., resource elements allocated for DMRS or other overhead) from the first quantity of resource elements allocated for the downlink transmission.

At 335, the UE 115-*b*, the base station 105-*b*, or both, may determine a TBS for the downlink data message. In some aspects, the UE 115-*b* and/or the base station 105-*b* may determine the TBS at 335 based on transmitting/receiving the first DCI at 305, determining the downlink transmission includes the downlink data message multiplexed with the second DCI at 310, the second resource allocation for the second DCI at 315, transmitting/receiving the one or more parameters for the downlink transmission at 320, determining the resource element density and/or quantity of resource elements allocated for the second DCI at 325, determining the third resource allocation at 330, or any combination thereof.

For example, the UE 115-*b* and/or the base station 105-*b* may determine the TBS of the downlink data message based on the first resource allocation for the downlink transmission (e.g., resource element density associated with the downlink transmission, quantity of resource elements allocated for the downlink transmission) and the second resource allocation for the second DCI (e.g., resource element density associated with the second DCI, quantity of resource elements allocated for the second DCI). For instance, as noted previously herein, the UE 115-*b* and/or the base station 105-*b* may determine the third resource allocation for the downlink data message based on the first resource allocation and the second resource allocation. The third resource allocation may include a resource element density associated with the downlink data message, a quantity of resource elements allocated for the downlink data message, or both. In this example, the UE 115-*b* and/or the base station 105-*b* may determine the TBS for the downlink data message based on the third resource allocation (e.g., resource element density, third quantity of resource elements) associated with the downlink data message.

Additionally or alternatively, the UE 115-*b* and/or the base station 105-*b* may determine the TBS associated with the downlink data message based on the one or more parameters associated with the downlink transmission transmitted at 320. For example, the UE 115-*b* may receive, from the base station 105-*b*, an indication of an MCS associated with the downlink transmission, an indication of a quantity of layers associated with the downlink transmission, a quantity of codewords associated with the downlink transmission, or any combination thereof. In this example, the UE 115-*b* may determine the TBS associated with the downlink data message based on the MCS, the quantity of layers, the quantity of codewords, or any combination thereof.

At 340, the base station 105-*b* may transmit the downlink transmission to the UE 115-*b*. The downlink transmission may include the downlink data message multiplexed with the second DCI. In some aspects, the base station 105-*b* may transmit the downlink transmission at 340 based on the TBS of the downlink data message. Additionally or alternatively, the base station 105-*b* may transmit the downlink transmission at 340 based on transmitting the first DCI at 305, determining the downlink transmission includes the downlink data message multiplexed with the second DCI at 310, transmitting the second resource allocation for the second DCI at 315, transmitting the one or more parameters for the downlink transmission at 320, determining the resource element density and/or quantity of resource elements allocated for the second DCI at 325, determining the third resource allocation at 330, or any combination thereof.

At 345, the UE 115-*b* may process the downlink transmission received from the base station 105-*b*. Processing the downlink transmission may include decoding the downlink transmission (e.g., decoding/interpreting the downlink data message, decoding/interpreting the second DCI). In some aspects, the UE 115-*b* may process the downlink transmission based on the TBS of the downlink data message. Additionally or alternatively, the UE 115-*b* may process the downlink transmission at 340 based on receiving the first DCI at 305, determining the downlink transmission includes the downlink data message multiplexed with the second DCI at 310, receiving the second resource allocation for the second DCI at 315, receiving the one or more parameters for the downlink transmission at 320, determining the resource element density and/or quantity of resource elements allocated for the second DCI at 325, determining the third resource allocation at 330, or any combination thereof.

Techniques described herein may support downlink transmissions including downlink data messages multiplexed with DCI (e.g., piggyback DCI) while reducing or eliminating adverse effects associated with transport block decoding at the UE 115-*b*. In particular, by enabling the UE 115-*b* to accurately and efficiently determine a TBS associated with the downlink data message, techniques described herein may enable efficient and reliable transport block decoding of the downlink data messages at the UE 115-*b*, thereby leading to improved wireless communications. Moreover, by enabling accurate TBS determination, techniques described herein may enable efficient use of piggyback DCI within downlink transmissions, thereby reducing control signaling overhead within a wireless communications system (e.g., wireless communications system 100 or 200).

Figure 4:
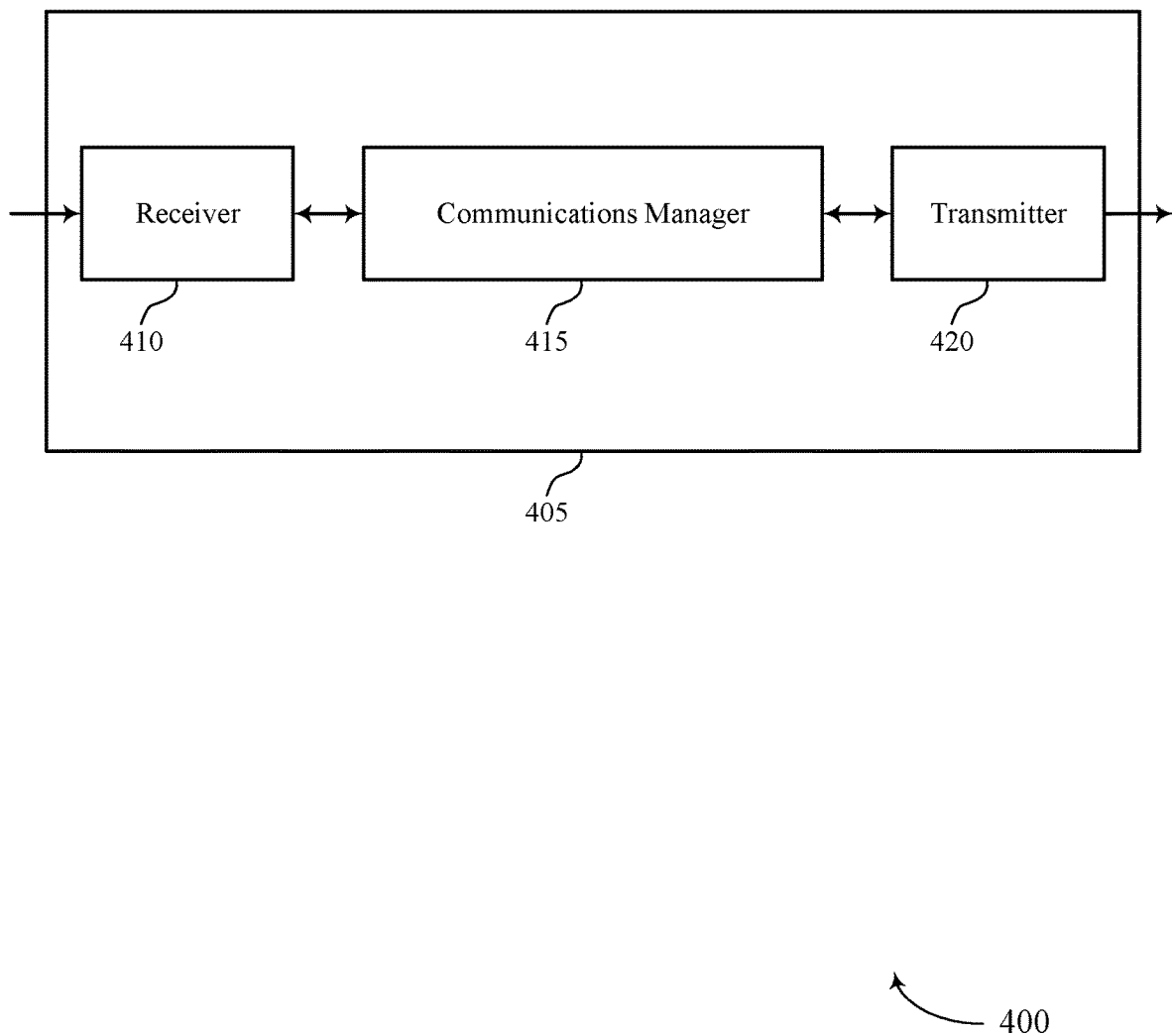
FIGS. 4 and 5 show block diagrams of devices that support TBS determination for downlink transmissions including multiplexed DCI in accordance with aspects of the present disclosure.

FIG. 4 shows a block diagram 400 of a device 405 that supports TBS determination for downlink transmissions including multiplexed DCI in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to TBS determination for downlink transmissions including multiplexed DCI, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, first DCI scheduling a downlink transmission at the UE, the first DCI including an indication of a first resource allocation for the downlink transmission, determine that the downlink transmission includes a downlink data message multiplexed with second DCI, process the downlink transmission based on the TBS of the downlink data message, receive, from the base station, an indication of a second resource allocation for the second DCI, and determine a TBS of the downlink data message based on the first resource allocation for the downlink transmission and the second resource allocation for the second DCI. The communications manager 415 may be an example of aspects of the communications manager 710 described herein.

The actions performed by the communications manager 415 as described herein may be implemented to realize one or more potential advantages. For example, by enabling determinations of a TBS associated with a downlink data message in the presence of piggyback DCI, the communications manager 415 may enable efficient and reliable transport block decoding, thereby leading to improved wireless communications. Moreover, by enabling accurate TBS determination, techniques described herein may enable efficient use of piggyback DCI within downlink transmissions, thereby reducing control signaling overhead within a wireless communications system (e.g., wireless communications system 100 or 200)

Based on scheduling multiple downlink data transmissions associated with one or more CORESET groups via a single DCI, a processor of the UE 115 (e.g., a processor controlling the receiver 410, the communications manager 415, the transmitter 420, etc.) may reduce processing resources used for downlink communications. For example, by enabling accurate TBS determinations in the presence of piggyback DCI, search space monitoring and blind decoding associated with DCI reception may be reduced, correspondingly reducing a number of times the processor ramps up processing power and turns on processing units to handle downlink reception of DCI.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
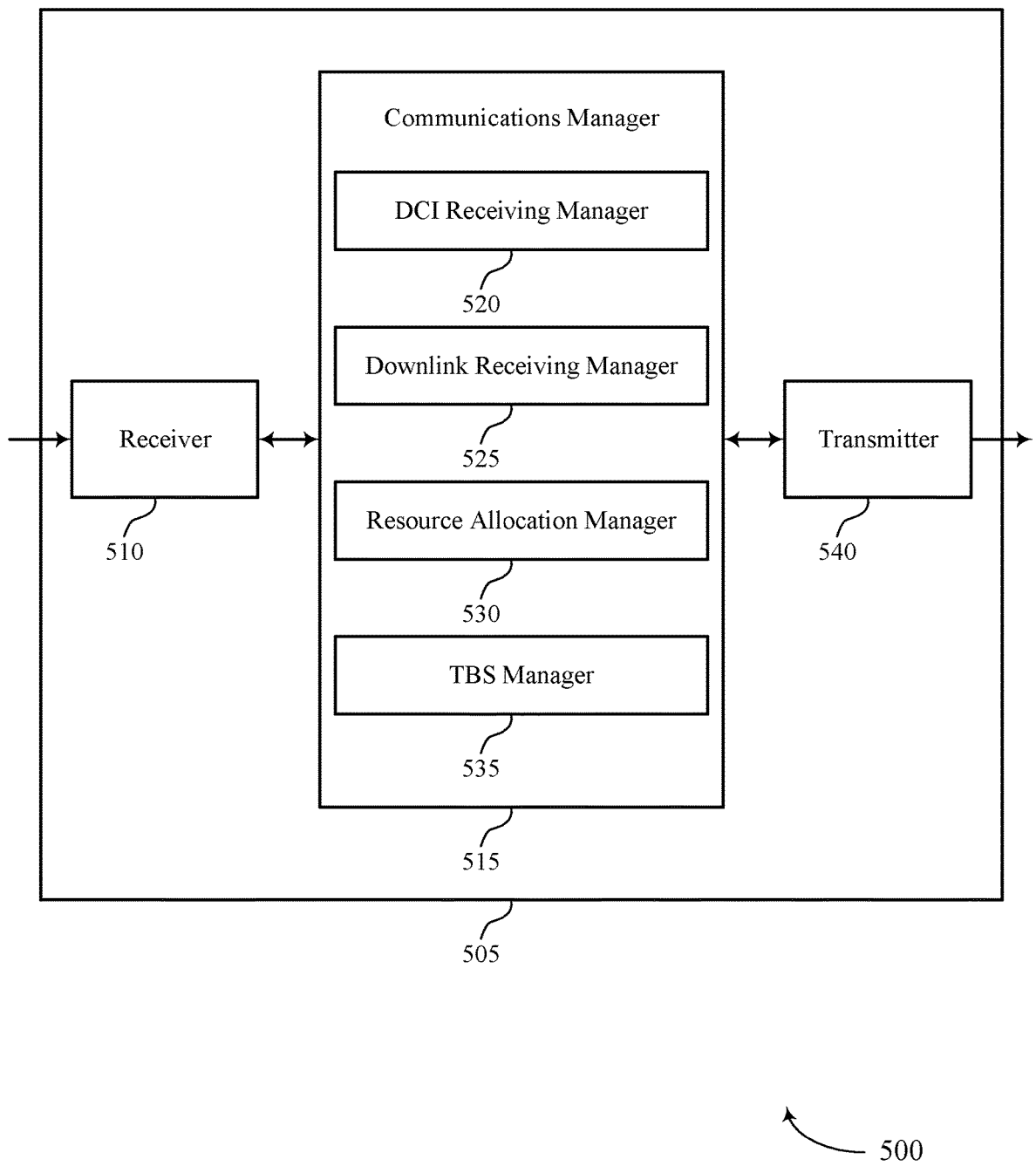

FIG. 5 shows a block diagram 500 of a device 505 that supports TBS determination for downlink transmissions including multiplexed DCI in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to TBS determination for downlink transmissions including multiplexed DCI, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a DCI receiving manager 520, a downlink receiving manager 525, a resource allocation manager 530, and a TBS manager 535. The communications manager 515 may be an example of aspects of the communications manager 710 described herein.

The DCI receiving manager 520 may receive, from a base station, first DCI scheduling a downlink transmission at the UE, the first DCI including an indication of a first resource allocation for the downlink transmission.

The downlink receiving manager 525 may determine that the downlink transmission includes a downlink data message multiplexed with second DCI and process the downlink transmission based on the TBS of the downlink data message.

The resource allocation manager 530 may receive, from the base station, an indication of a second resource allocation for the second DCI.

The TBS manager 535 may determine a TBS of the downlink data message based on the first resource allocation for the downlink transmission and the second resource allocation for the second DCI.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
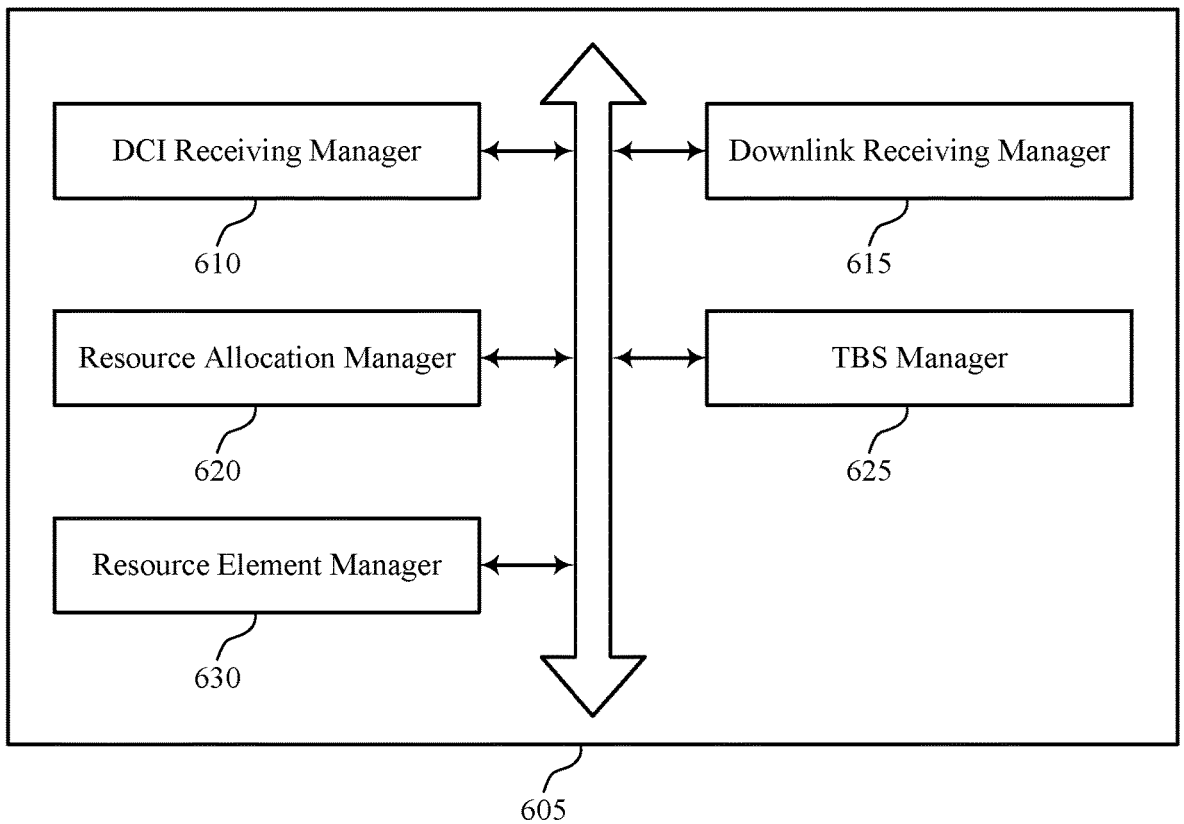
FIG. 6 shows a block diagram of a communications manager that supports TBS determination for downlink transmissions including multiplexed DCI in accordance with aspects of the present disclosure.

FIG. 6 shows a block diagram 600 of a communications manager 605 that supports TBS determination for downlink transmissions including multiplexed DCI in accordance with aspects of the present disclosure. The communications manager 605 may be an example of aspects of a communications manager 415, a communications manager 515, or a communications manager 710 described herein. The communications manager 605 may include a DCI receiving manager 610, a downlink receiving manager 615, a resource allocation manager 620, a TBS manager 625, and a resource element manager 630. Each of these modules may communicate, directly or indirectly, with one another (e.g., via one or more buses).

The DCI receiving manager 610 may receive, from a base station, first DCI scheduling a downlink transmission at the UE, the first DCI including an indication of a first resource allocation for the downlink transmission. In some examples, the DCI receiving manager 610 may receive, via a first bit field of the first DCI, an indication that the downlink transmission includes the downlink data message. In some examples, the DCI receiving manager 610 may receive, via a second bit field of the first DCI, an indication that the downlink transmission includes the second DCI, where determining that the downlink transmission includes the downlink data message multiplexed with the second DCI is based on the first bit field and the second bit field. In some cases, the indication of the second resource allocation for the second DCI is received via the first DCI.

The downlink receiving manager 615 may determine that the downlink transmission includes a downlink data message multiplexed with second DCI. In some examples, the downlink receiving manager 615 may process the downlink transmission based on the TBS of the downlink data message. In some examples, the downlink receiving manager 615 may receive, from the base station, an indication of a quantity of symbols allocated for the second DCI. In some examples, the downlink receiving manager 615 may receive, from the base station, an indication of a MCS associated with the downlink transmission, a quantity of layers associated with the downlink transmission, a quantity of codewords associated with the downlink transmissions, or any combination thereof, where determining the TBS is based on the third quantity of resource elements and the MCS, the quantity of layers, the quantity of codewords, or any combination thereof.

The resource allocation manager 620 may receive, from the base station, an indication of a second resource allocation for the second DCI. In some examples, the resource allocation manager 620 may determine a third resource allocation for the downlink data message based on the first resource allocation for the downlink transmission and the second resource allocation for the second DCI, where the TBS is based on the third resource allocation. In some cases, the second resource allocation includes an indication of a quantity of resource elements allocated for the second DCI, where determining the TBS is based on the quantity of resource elements allocated for the second DCI.

The TBS manager 625 may determine a TBS of the downlink data message based on the first resource allocation for the downlink transmission and the second resource allocation for the second DCI.

The resource element manager 630 may determine a resource element density associated with the second DCI based on the second resource allocation, where determining the TBS of the downlink data message is based on the resource element density associated with the second DCI. In some examples, the resource element manager 630 may determine a quantity of resource elements allocated for the second DCI based on the resource element density and the quantity of symbols allocated for the second DCI, where determining the TBS is based on the quantity of symbols allocated for the second DCI.

In some examples, the resource element manager 630 may determine a first quantity of resource elements allocated for the downlink transmission based on the first resource allocation. In some examples, the resource element manager 630 may determine a second quantity of resource elements allocated for the second DCI based on the second resource allocation. In some examples, the resource element manager 630 may determine a third quantity of resource elements allocated for the downlink data message based on the first quantity of resource elements and the second quantity of resource elements, where the TBS is based on the third quantity of resource elements.

In some cases, the resource element density includes a quantity of resource elements per resource block allocated for the second DCI.

Figure 7:
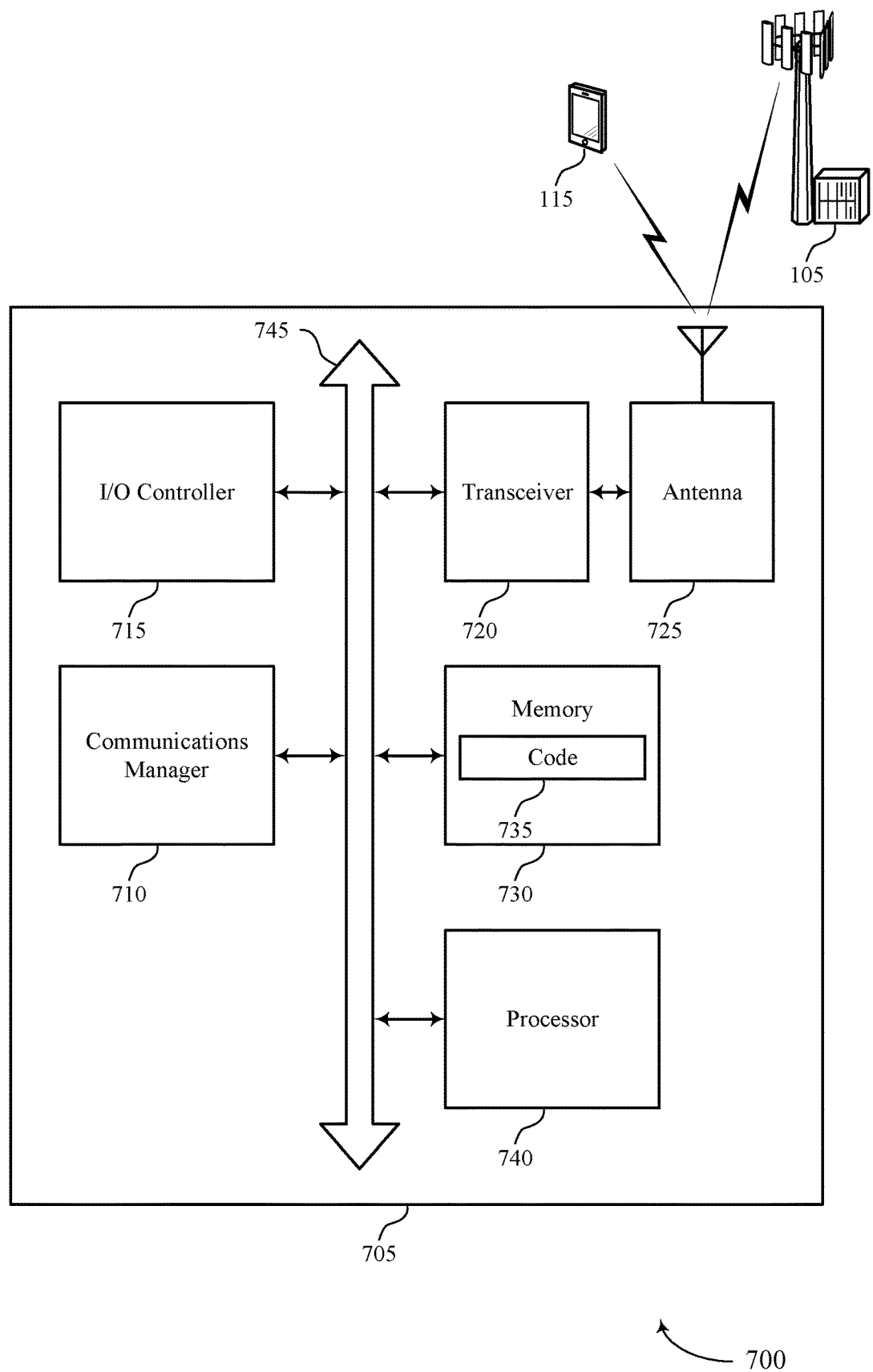
FIG. 7 shows a diagram of a system including a device that supports TBS determination for downlink transmissions including multiplexed DCI in accordance with aspects of the present disclosure.

FIG. 7 shows a diagram of a system 700 including a device 705 that supports TBS determination for downlink transmissions including multiplexed DCI in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, first DCI scheduling a downlink transmission at the UE, the first DCI including an indication of a first resource allocation for the downlink transmission, determine that the downlink transmission includes a downlink data message multiplexed with second DCI, process the downlink transmission based on the TBS of the downlink data message, receive, from the base station, an indication of a second resource allocation for the second DCI, and determine a TBS of the downlink data message based on the first resource allocation for the downlink transmission and the second resource allocation for the second DCI.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting TBS determination for downlink transmissions including multiplexed DCI).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
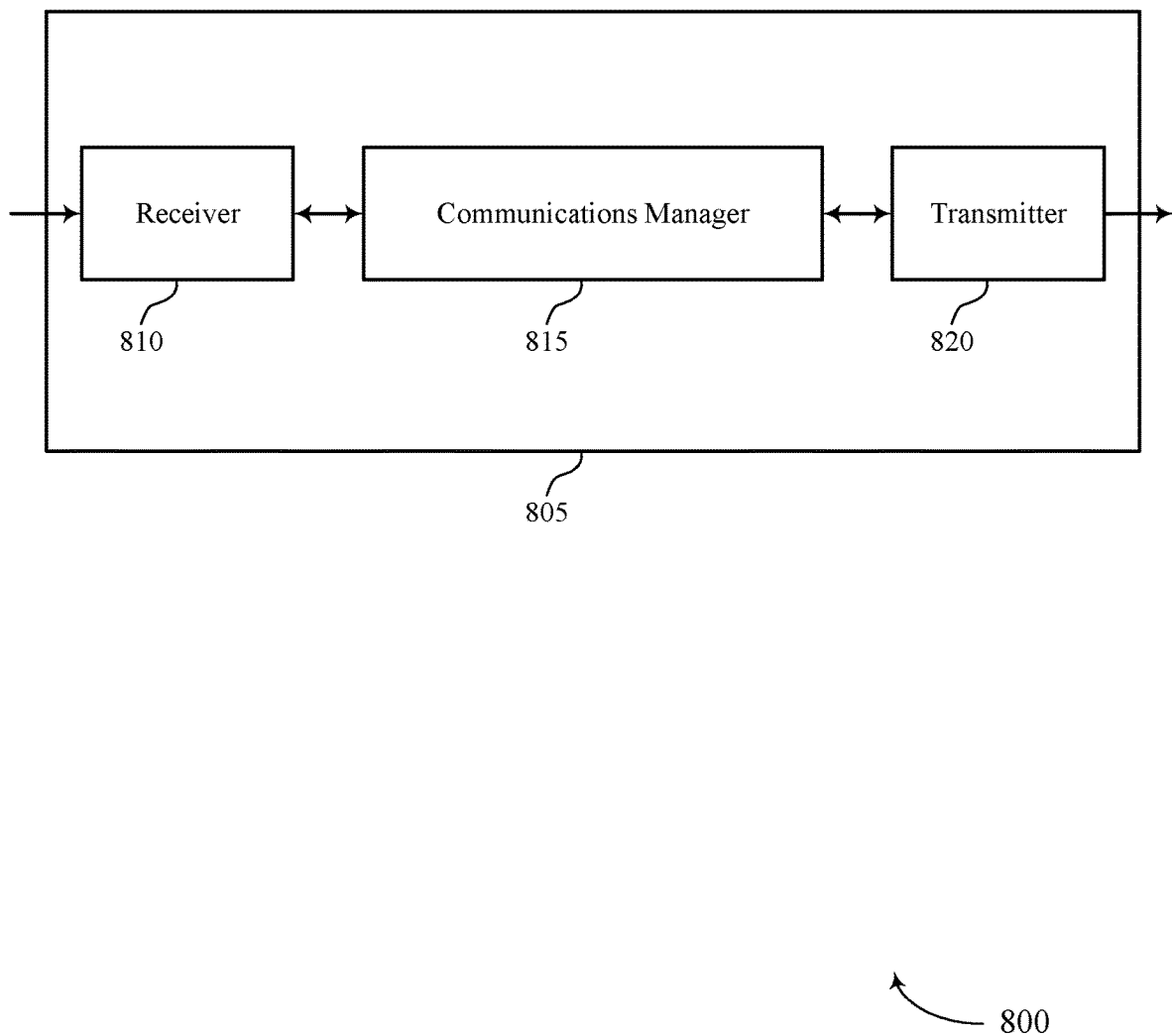
FIGS. 8 and 9 show block diagrams of devices that support TBS determination for downlink transmissions including multiplexed DCI in accordance with aspects of the present disclosure.

FIG. 8 shows a block diagram 800 of a device 805 that supports TBS determination for downlink transmissions including multiplexed DCI in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to TBS determination for downlink transmissions including multiplexed DCI, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to the UE, first DCI scheduling a downlink transmission at the UE, the first DCI including an indication of a first resource allocation for the downlink transmission, determine that the downlink transmission includes a downlink data message multiplexed with second DCI, transmit, to the UE, an indication of a second resource allocation for the second DCI, determine a TBS of the downlink data message based on the first resource allocation for the downlink transmission and the second resource allocation for the second DCI, and transmit, to the UE, the downlink transmission based on the TBS of the downlink data message. The communications manager 815 may be an example of aspects of the communications manager 1110 described herein.

The actions performed by the communications manager 815 as described herein may be implemented to realize one or more potential advantages. For example, by enabling determinations of a TBS associated with a downlink data message in the presence of piggyback DCI, the communications manager 815 may enable efficient and reliable transport block decoding, thereby leading to improved wireless communications. Moreover, by enabling accurate TBS determination, techniques described herein may enable efficient use of piggyback DCI within downlink transmissions, thereby reducing control signaling overhead within a wireless communications system (e.g., wireless communications system 100 or 200)

Based on scheduling multiple downlink data transmissions associated with one or more CORESET groups via a single DCI, a processor of the base station 105 (e.g., a processor controlling the receiver 810, the communications manager 815, the transmitter 820, etc.) may reduce processing resources used for downlink communications. For example, by enabling accurate TBS determinations in the presence of piggyback DCI, search space monitoring and blind decoding associated with DCI at the UE 115 reception may be reduced, correspondingly reducing a number of times the processor ramps up processing power and turns on processing units to handle transmission of DCI.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
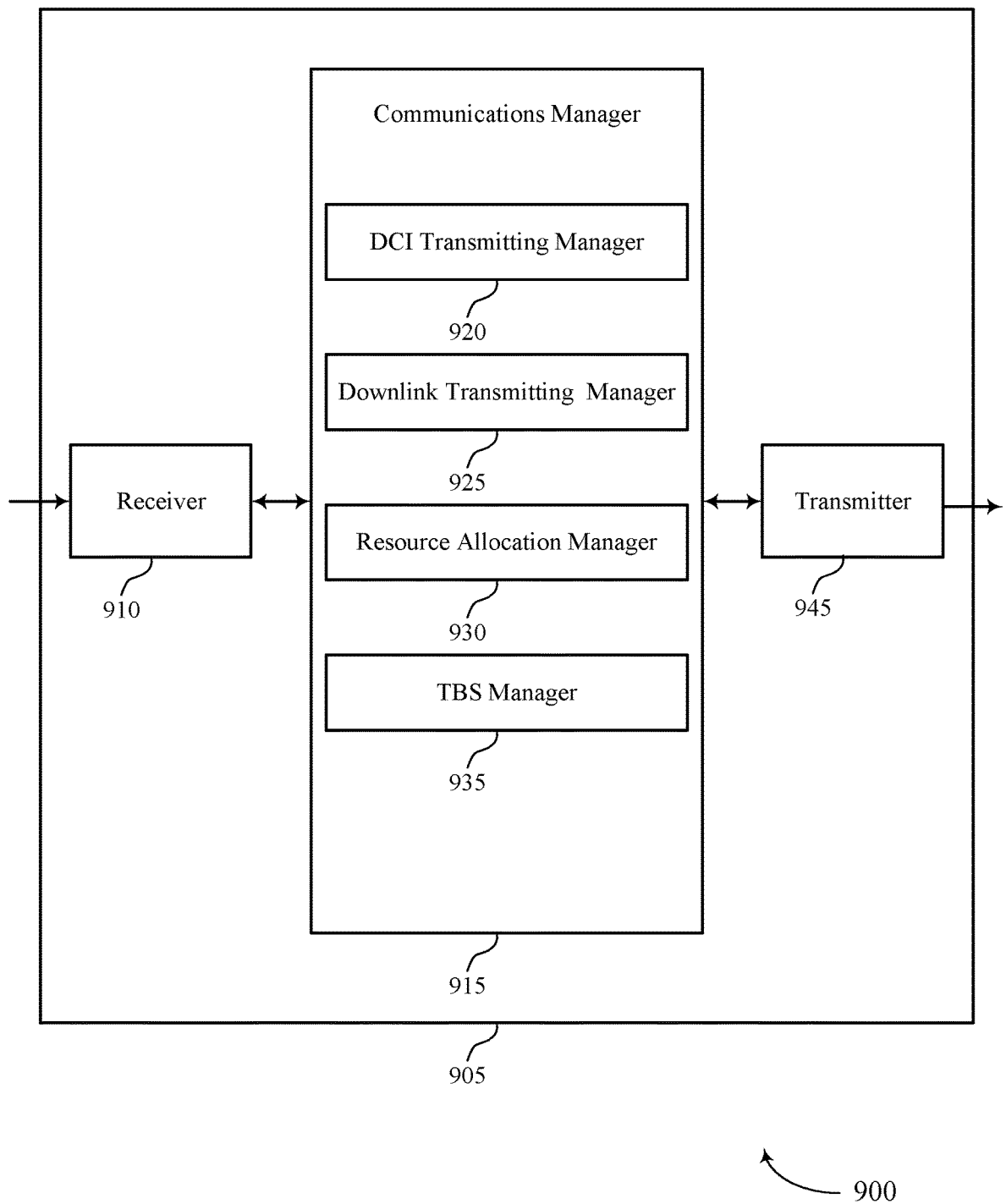

FIG. 9 shows a block diagram 900 of a device 905 that supports TBS determination for downlink transmissions including multiplexed DCI in accordance with aspects of the present disclosure. The device 905 may be an example of aspects of a device 805, or a base station 105 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to TBS determination for downlink transmissions including multiplexed DCI, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a DCI transmitting manager 920, a downlink transmitting manager 925, a resource allocation manager 930, and a TBS manager 935. The communications manager 915 may be an example of aspects of the communications manager 1110 described herein.

The DCI transmitting manager 920 may transmit, to the UE, first DCI scheduling a downlink transmission at the UE, the first DCI including an indication of a first resource allocation for the downlink transmission.

The downlink transmitting manager 925 may determine that the downlink transmission includes a downlink data message multiplexed with second DCI.

The resource allocation manager 930 may transmit, to the UE, an indication of a second resource allocation for the second DCI.

The TBS manager 935 may determine a TBS of the downlink data message based on the first resource allocation for the downlink transmission and the second resource allocation for the second DCI.

The downlink transmitting manager 925 may transmit, to the UE, the downlink transmission based on the TBS of the downlink data message.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
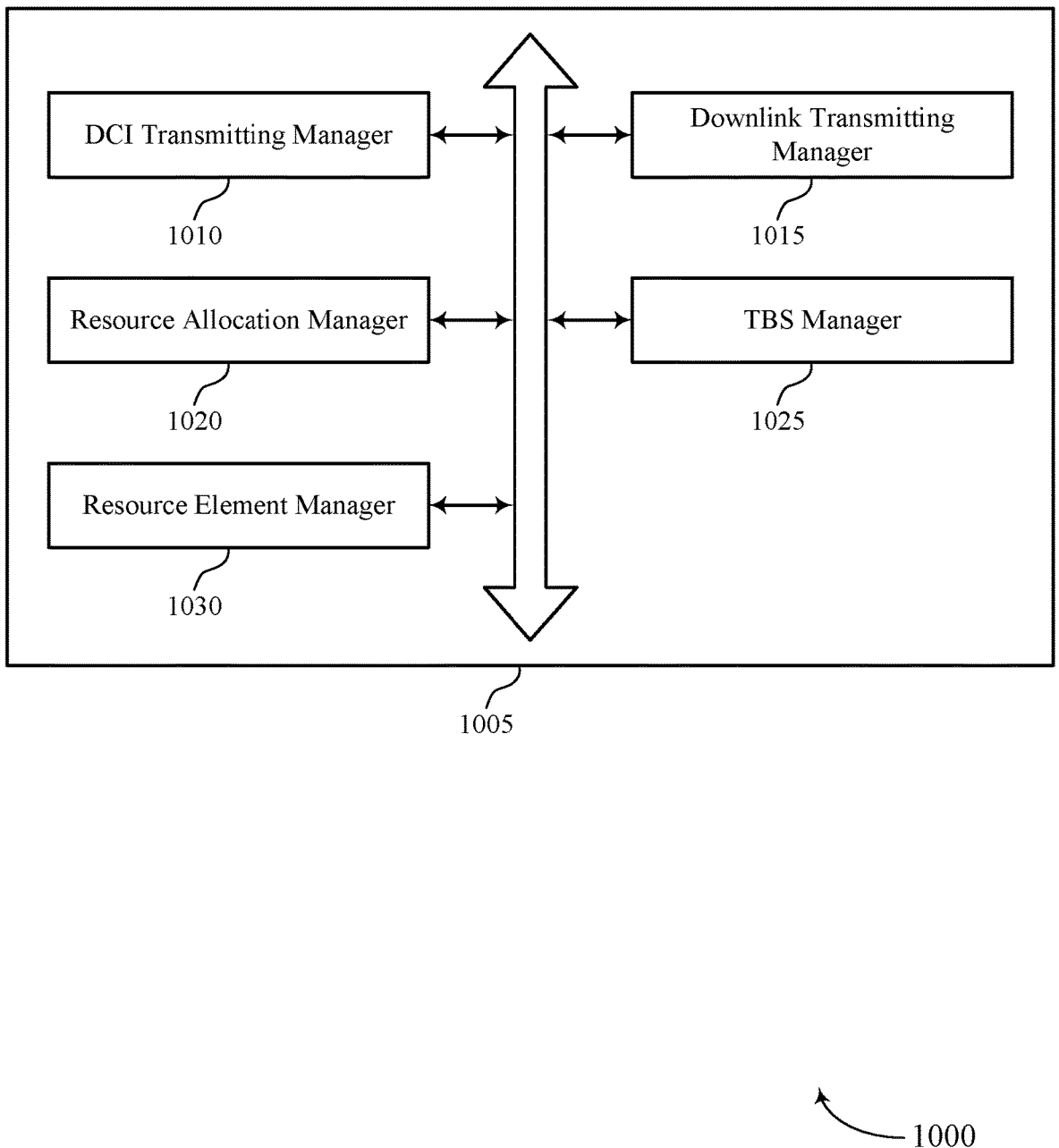
FIG. 10 shows a block diagram of a communications manager that supports TBS determination for downlink transmissions including multiplexed DCI in accordance with aspects of the present disclosure.

FIG. 10 shows a block diagram 1000 of a communications manager 1005 that supports TBS determination for downlink transmissions including multiplexed DCI in accordance with aspects of the present disclosure. The communications manager 1005 may be an example of aspects of a communications manager 815, a communications manager 915, or a communications manager 1110 described herein. The communications manager 1005 may include a DCI transmitting manager 1010, a downlink transmitting manager 1015, a resource allocation manager 1020, a TBS manager 1025, and a resource element manager 1030. Each of these modules may communicate, directly or indirectly, with one another (e.g., via one or more buses).

The DCI transmitting manager 1010 may transmit, to the UE, first DCI scheduling a downlink transmission at the UE, the first DCI including an indication of a first resource allocation for the downlink transmission. In some examples, the DCI transmitting manager 1010 may transmit, via a first bit field of the first DCI, an indication that the downlink transmission includes the downlink data message. In some examples, the DCI transmitting manager 1010 may transmit, via a second bit field of the first DCI, an indication that the downlink transmission includes the second DCI, where determining that the downlink transmission includes the downlink data message multiplexed with the second DCI is based on the first bit field and the second bit field. In some cases, the indication of the second resource allocation for the second DCI is transmitted via the first DCI.

The downlink transmitting manager 1015 may determine that the downlink transmission includes a downlink data message multiplexed with second DCI. The downlink transmitting manager 1015 may transmit, to the UE, the downlink transmission based on the TBS of the downlink data message. In some examples, the downlink transmitting manager 1015 may transmit, to the UE, an indication of a quantity of symbols allocated for the second DCI. In some examples, the downlink transmitting manager 1015 may transmit, to the UE, an indication of a MCS associated with the downlink transmission, a quantity of layers associated with the downlink transmission, a quantity of codewords associated with the downlink transmissions, or any combination thereof, where determining the TBS is based on the third quantity of resource elements and the MCS, the quantity of layers, the quantity of codewords, or any combination thereof.

The resource allocation manager 1020 may transmit, to the UE, an indication of a second resource allocation for the second DCI. In some examples, the resource allocation manager 1020 may determine a third resource allocation for the downlink data message based on the first resource allocation for the downlink transmission and the second resource allocation for the second DCI, where the TBS is based on the third resource allocation. In some cases, the second resource allocation includes an indication of a quantity of resource elements allocated for the second DCI, where determining the TBS is based on the quantity of resource elements allocated for the second DCI.

The TBS manager 1025 may determine a TBS of the downlink data message based on the first resource allocation for the downlink transmission and the second resource allocation for the second DCI.

The resource element manager 1030 may determine a resource element density associated with the second DCI based on the second resource allocation, where determining the TBS of the downlink data message is based on the resource element density associated with the second DCI. In some examples, the resource element manager 1030 may determine a quantity of resource elements allocated for the second DCI based on the resource element density and the quantity of symbols allocated for the second DCI, where determining the TBS is based on the quantity of symbols allocated for the second DCI. In some examples, the resource element manager 1030 may determine a first quantity of resource elements allocated for the downlink transmission based on the first resource allocation. In some examples, the resource element manager 1030 may determine a second quantity of resource elements allocated for the second DCI based on the second resource allocation. In some examples, the resource element manager 1030 may determine a third quantity of resource elements allocated for the downlink data message based on the first quantity of resource elements and the second quantity of resource elements, where the TBS is based on the third quantity of resource elements. In some cases, the resource element density includes a quantity of resource elements per resource block allocated for the second DCI.

Figure 11:
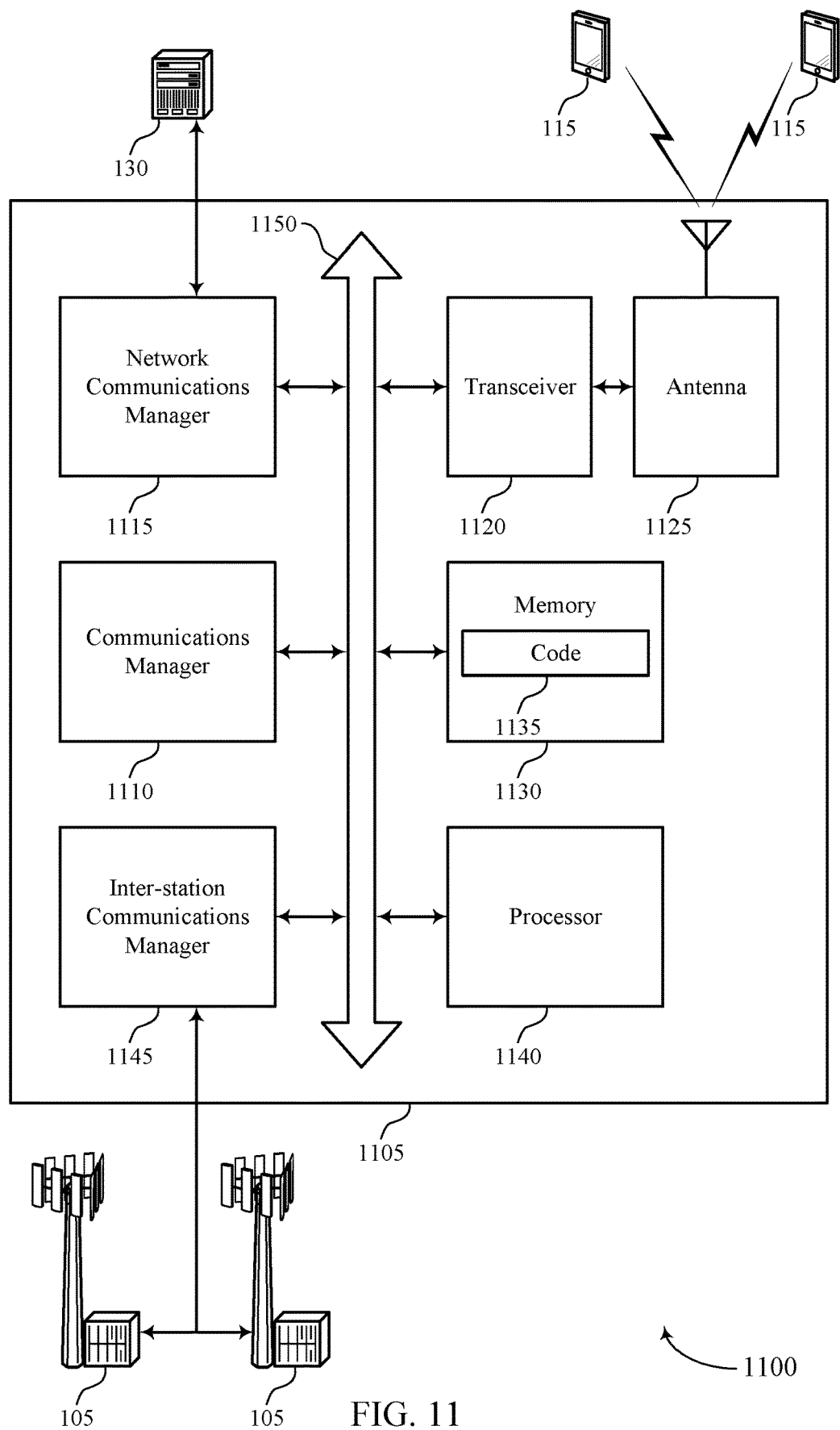
FIG. 11 shows a diagram of a system including a device that supports TBS determination for downlink transmissions including multiplexed DCI in accordance with aspects of the present disclosure.

FIG. 11 shows a diagram of a system 1100 including a device 1105 that supports TBS determination for downlink transmissions including multiplexed DCI in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to the UE, first DCI scheduling a downlink transmission at the UE, the first DCI including an indication of a first resource allocation for the downlink transmission, determine that the downlink transmission includes a downlink data message multiplexed with second DCI, transmit, to the UE, an indication of a second resource allocation for the second DCI, determine a TBS of the downlink data message based on the first resource allocation for the downlink transmission and the second resource allocation for the second DCI, and transmit, to the UE, the downlink transmission based on the TBS of the downlink data message.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting TBS determination for downlink transmissions including multiplexed DCI).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
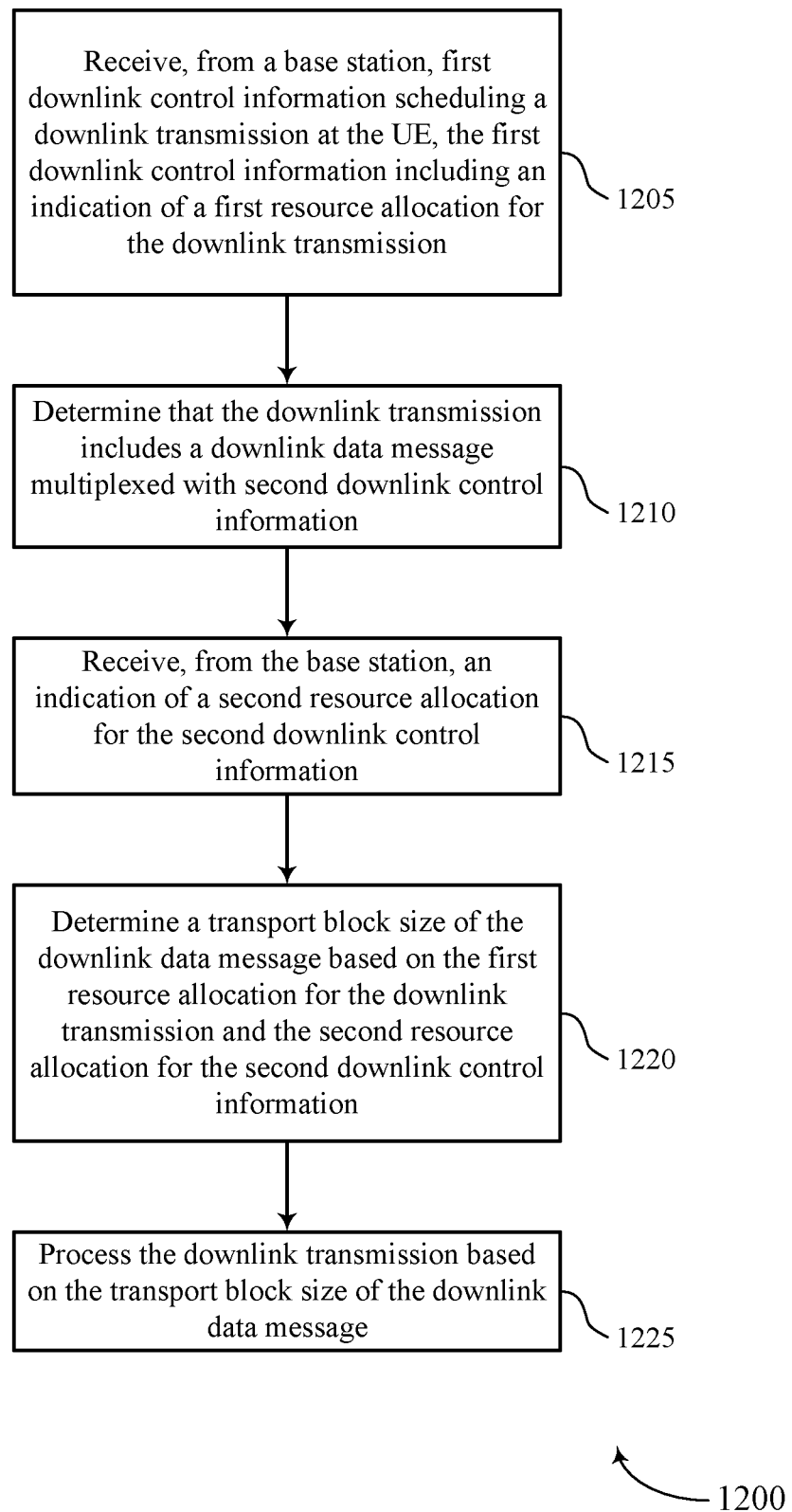
FIGS. 12 through 16 show flowcharts illustrating methods that support TBS determination for downlink transmissions including multiplexed DCI in accordance with aspects of the present disclosure.

FIG. 12 shows a flowchart illustrating a method 1200 that supports TBS determination for downlink transmissions including multiplexed DCI in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive, from a base station, first DCI scheduling a downlink transmission at the UE, the first DCI including an indication of a first resource allocation for the downlink transmission. The operations of 1205 may be performed according to the methods described herein. In some examples, aspects of the operations of 1205 may be performed by a DCI receiving manager as described with reference to FIGS. 4 through 7.

At 1210, the UE may determine that the downlink transmission includes a downlink data message multiplexed with second DCI. The operations of 1210 may be performed according to the methods described herein. In some examples, aspects of the operations of 1210 may be performed by a downlink receiving manager as described with reference to FIGS. 4 through 7.

At 1215, the UE may receive, from the base station, an indication of a second resource allocation for the second DCI. The operations of 1215 may be performed according to the methods described herein. In some examples, aspects of the operations of 1215 may be performed by a resource allocation manager as described with reference to FIGS. 4 through 7.

At 1220, the UE may determine a TBS of the downlink data message based on the first resource allocation for the downlink transmission and the second resource allocation for the second DCI. The operations of 1220 may be performed according to the methods described herein. In some examples, aspects of the operations of 1220 may be performed by a TBS manager as described with reference to FIGS. 4 through 7.

At 1225, the UE may process the downlink transmission based on the TBS of the downlink data message. The operations of 1225 may be performed according to the methods described herein. In some examples, aspects of the operations of 1225 may be performed by a downlink receiving manager as described with reference to FIGS. 4 through 7.

Figure 13:
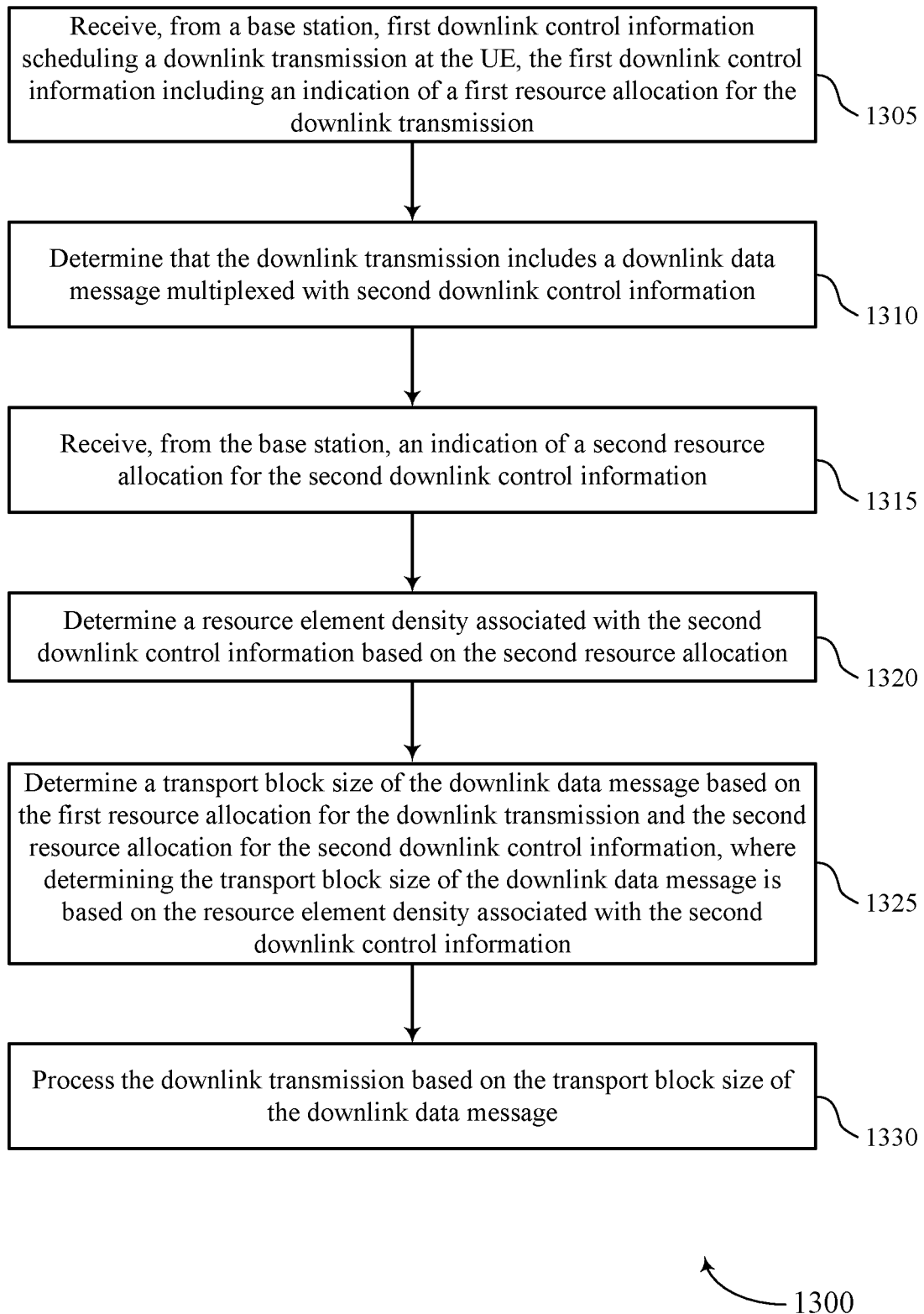

FIG. 13 shows a flowchart illustrating a method 1300 that supports TBS determination for downlink transmissions including multiplexed DCI in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, first DCI scheduling a downlink transmission at the UE, the first DCI including an indication of a first resource allocation for the downlink transmission. The operations of 1305 may be performed according to the methods described herein. In some examples, aspects of the operations of 1305 may be performed by a DCI receiving manager as described with reference to FIGS. 4 through 7.

At 1310, the UE may determine that the downlink transmission includes a downlink data message multiplexed with second DCI. The operations of 1310 may be performed according to the methods described herein. In some examples, aspects of the operations of 1310 may be performed by a downlink receiving manager as described with reference to FIGS. 4 through 7.

At 1315, the UE may receive, from the base station, an indication of a second resource allocation for the second DCI. The operations of 1315 may be performed according to the methods described herein. In some examples, aspects of the operations of 1315 may be performed by a resource allocation manager as described with reference to FIGS. 4 through 7.

At 1320, the UE may determine a resource element density associated with the second DCI based on the second resource allocation. The operations of 1320 may be performed according to the methods described herein. In some examples, aspects of the operations of 1320 may be performed by a resource element manager as described with reference to FIGS. 4 through 7.

At 1325, the UE may determine a TBS of the downlink data message based on the first resource allocation for the downlink transmission and the second resource allocation for the second DCI, where determining the TBS of the downlink data message is based on the resource element density associated with the second DCI. The operations of 1325 may be performed according to the methods described herein. In some examples, aspects of the operations of 1325 may be performed by a TBS manager as described with reference to FIGS. 4 through 7.

At 1330, the UE may process the downlink transmission based on the TBS of the downlink data message. The operations of 1330 may be performed according to the methods described herein. In some examples, aspects of the operations of 1330 may be performed by a downlink receiving manager as described with reference to FIGS. 4 through 7.

Figure 14:
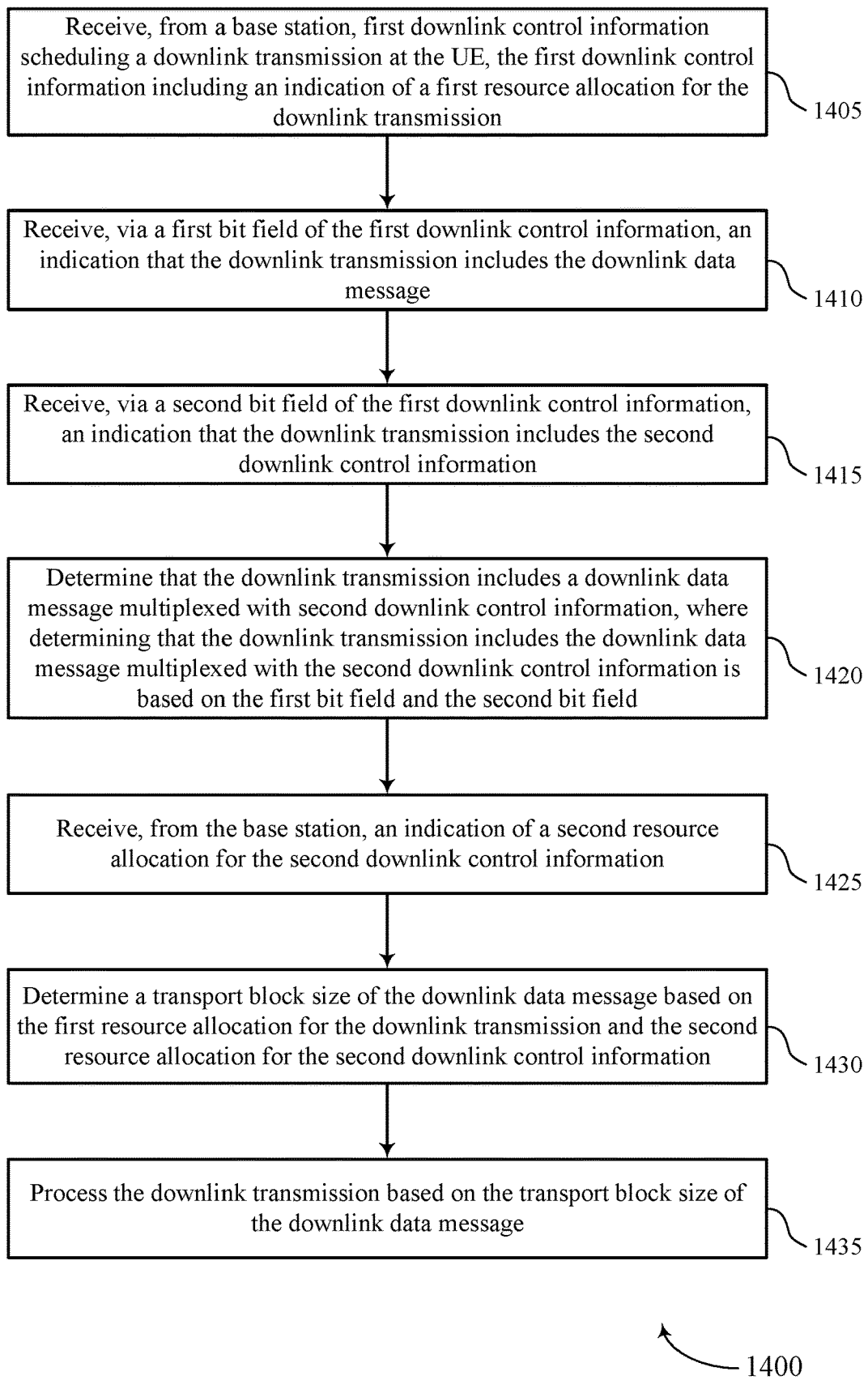

FIG. 14 shows a flowchart illustrating a method 1400 that supports TBS determination for downlink transmissions including multiplexed DCI in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, first DCI scheduling a downlink transmission at the UE, the first DCI including an indication of a first resource allocation for the downlink transmission. The operations of 1405 may be performed according to the methods described herein. In some examples, aspects of the operations of 1405 may be performed by a DCI receiving manager as described with reference to FIGS. 4 through 7.

At 1410, the UE may receive, via a first bit field of the first DCI, an indication that the downlink transmission includes the downlink data message. The operations of 1410 may be performed according to the methods described herein. In some examples, aspects of the operations of 1410 may be performed by a DCI receiving manager as described with reference to FIGS. 4 through 7.

At 1415, the UE may receive, via a second bit field of the first DCI, an indication that the downlink transmission includes the second DCI. The operations of 1415 may be performed according to the methods described herein. In some examples, aspects of the operations of 1415 may be performed by a DCI receiving manager as described with reference to FIGS. 4 through 7.

At 1420, the UE may determine that the downlink transmission includes a downlink data message multiplexed with second DCI, where determining that the downlink transmission includes the downlink data message multiplexed with the second DCI is based on the first bit field and the second bit field. The operations of 1420 may be performed according to the methods described herein. In some examples, aspects of the operations of 1420 may be performed by a downlink receiving manager as described with reference to FIGS. 4 through 7.

At 1425, the UE may receive, from the base station, an indication of a second resource allocation for the second DCI. The operations of 1425 may be performed according to the methods described herein. In some examples, aspects of the operations of 1425 may be performed by a resource allocation manager as described with reference to FIGS. 4 through 7.

At 1430, the UE may determine a TBS of the downlink data message based on the first resource allocation for the downlink transmission and the second resource allocation for the second DCI. The operations of 1430 may be performed according to the methods described herein. In some examples, aspects of the operations of 1430 may be performed by a TBS manager as described with reference to FIGS. 4 through 7.

At 1435, the UE may process the downlink transmission based on the TBS of the downlink data message. The operations of 1435 may be performed according to the methods described herein. In some examples, aspects of the operations of 1435 may be performed by a downlink receiving manager as described with reference to FIGS. 4 through 7.

Figure 15:
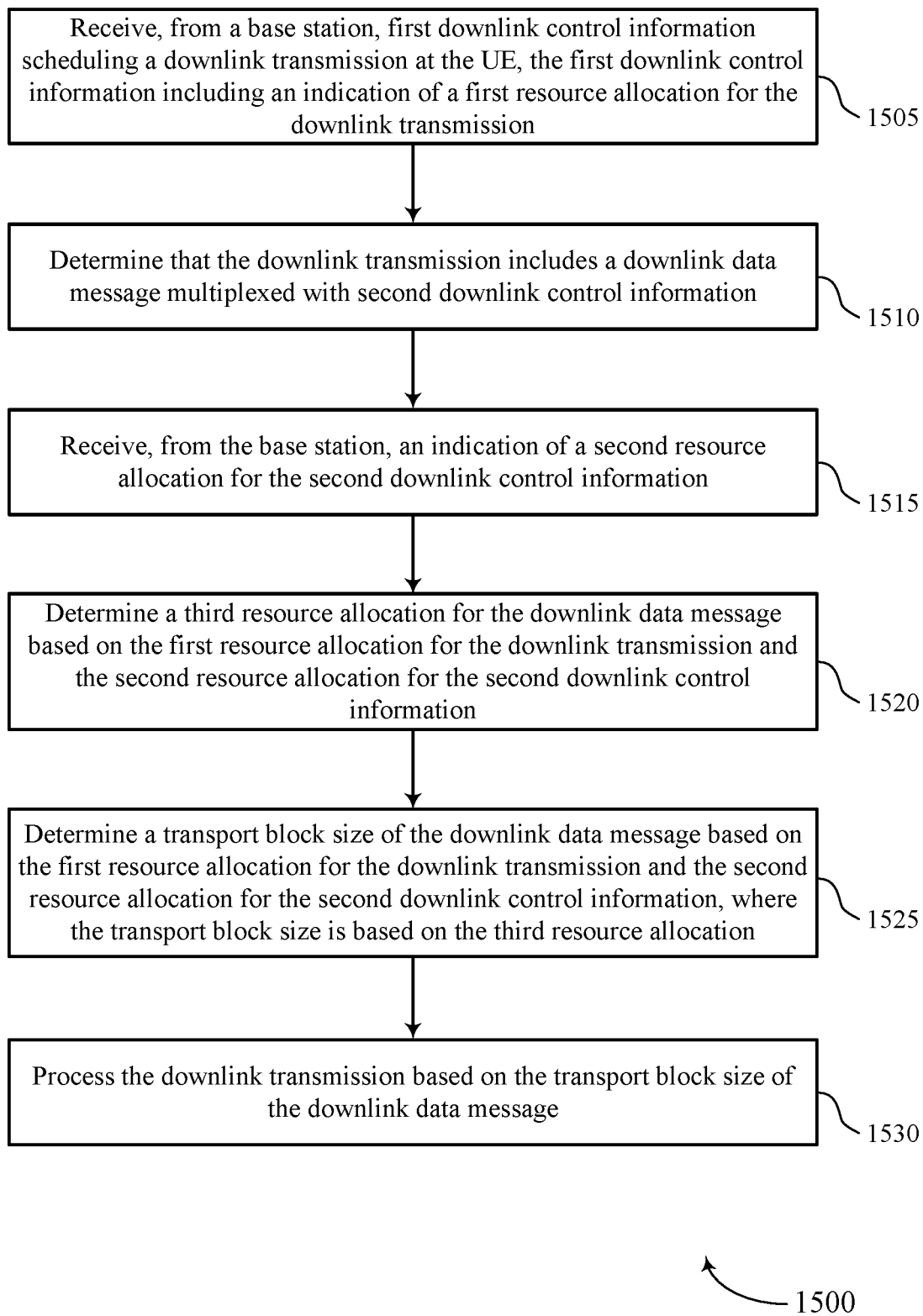

FIG. 15 shows a flowchart illustrating a method 1500 that supports TBS determination for downlink transmissions including multiplexed DCI in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, first DCI scheduling a downlink transmission at the UE, the first DCI including an indication of a first resource allocation for the downlink transmission. The operations of 1505 may be performed according to the methods described herein. In some examples, aspects of the operations of 1505 may be performed by a DCI receiving manager as described with reference to FIGS. 4 through 7.

At 1510, the UE may determine that the downlink transmission includes a downlink data message multiplexed with second DCI. The operations of 1510 may be performed according to the methods described herein. In some examples, aspects of the operations of 1510 may be performed by a downlink receiving manager as described with reference to FIGS. 4 through 7.

At 1515, the UE may receive, from the base station, an indication of a second resource allocation for the second DCI. In some aspects, the indication of the second resource allocation may be transmitted via the first DCI at 1505. The operations of 1515 may be performed according to the methods described herein. In some examples, aspects of the operations of 1515 may be performed by a resource allocation manager as described with reference to FIGS. 4 through 7.

At 1520, the UE may determine a third resource allocation for the downlink data message based on the first resource allocation for the downlink transmission and the second resource allocation for the second DCI. The operations of 1520 may be performed according to the methods described herein. In some examples, aspects of the operations of 1520 may be performed by a resource allocation manager as described with reference to FIGS. 4 through 7.

At 1525, the UE may determine a TBS of the downlink data message based on the first resource allocation for the downlink transmission and the second resource allocation for the second DCI, where the TBS is based on the third resource allocation. The operations of 1525 may be performed according to the methods described herein. In some examples, aspects of the operations of 1525 may be performed by a TBS manager as described with reference to FIGS. 4 through 7.

At 1530, the UE may process the downlink transmission based on the TBS of the downlink data message. The operations of 1530 may be performed according to the methods described herein. In some examples, aspects of the operations of 1530 may be performed by a downlink receiving manager as described with reference to FIGS. 4 through 7.

Figure 16:
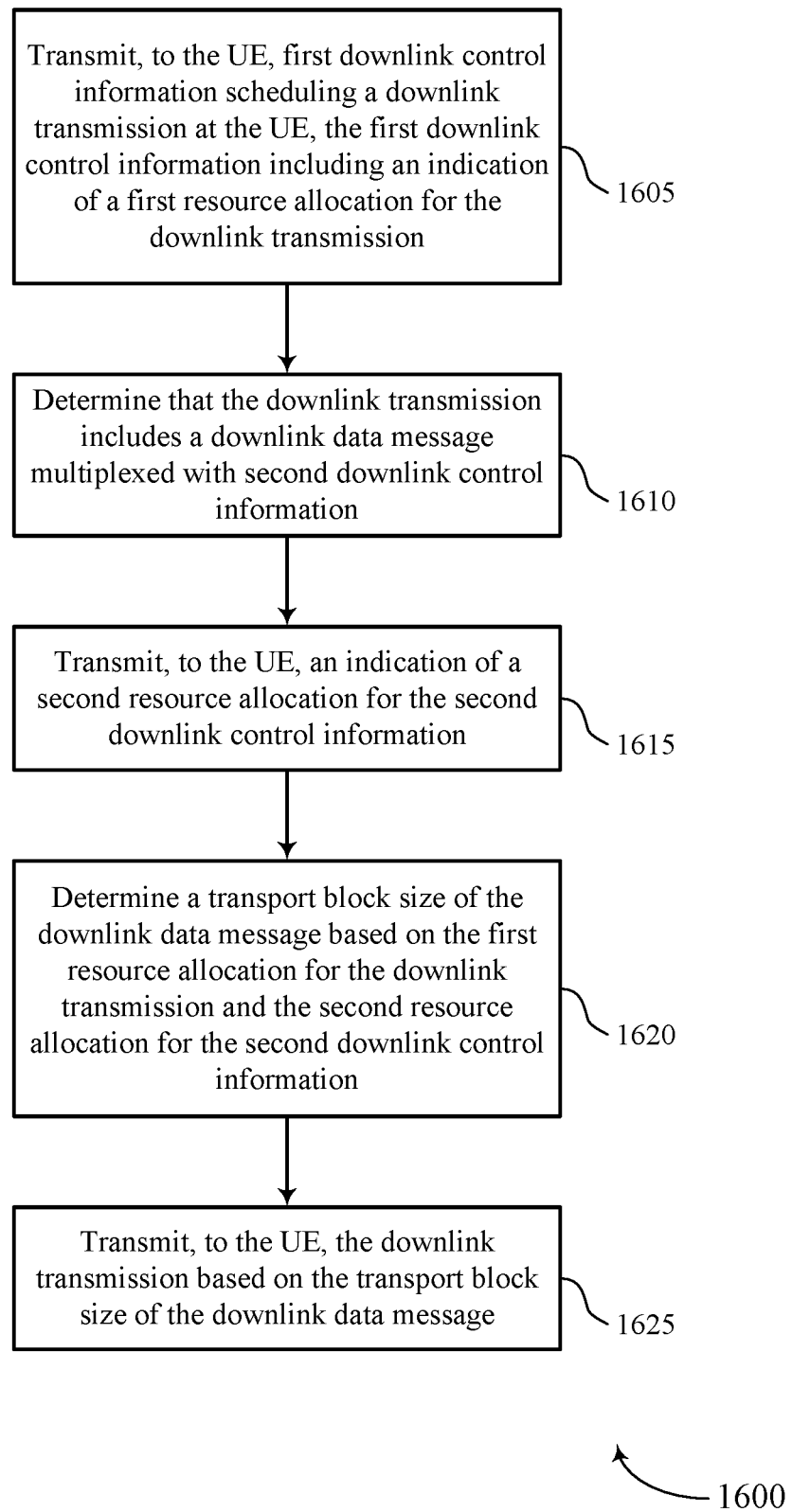

FIG. 16 shows a flowchart illustrating a method 1600 that supports TBS determination for downlink transmissions including multiplexed DCI in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may transmit, to the UE, first DCI scheduling a downlink transmission at the UE, the first DCI including an indication of a first resource allocation for the downlink transmission. The operations of 1605 may be performed according to the methods described herein. In some examples, aspects of the operations of 1605 may be performed by a DCI transmitting manager as described with reference to FIGS. 8 through 11.

At 1610, the base station may determine that the downlink transmission includes a downlink data message multiplexed with second DCI. The operations of 1610 may be performed according to the methods described herein. In some examples, aspects of the operations of 1610 may be performed by a downlink transmitting manager as described with reference to FIGS. 8 through 11.

At 1615, the base station may transmit, to the UE, an indication of a second resource allocation for the second DCI. In some aspects, the indication of the second resource allocation may be transmitted via the first DCI at 1605. The operations of 1615 may be performed according to the methods described herein. In some examples, aspects of the operations of 1615 may be performed by a resource allocation manager as described with reference to FIGS. 8 through 11.

At 1620, the base station may determine a TBS of the downlink data message based on the first resource allocation for the downlink transmission and the second resource allocation for the second DCI. The operations of 1620 may be performed according to the methods described herein. In some examples, aspects of the operations of 1620 may be performed by a TBS manager as described with reference to FIGS. 8 through 11.

At 1625, the base station may transmit, to the UE, the downlink transmission based on the TBS of the downlink data message. The operations of 1625 may be performed according to the methods described herein. In some examples, aspects of the operations of 1625 may be performed by a downlink transmitting manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a network entity, first downlink control information scheduling a downlink transmission at the UE, the first downlink control information comprising an indication of a first resource allocation for the downlink transmission;
    determining that the downlink transmission includes a downlink data message multiplexed with second downlink control information;
    receiving, from the network entity, an indication of a second resource allocation for the second downlink control information, wherein the second resource allocation comprises an indication of a quantity of resource elements of the downlink transmission allocated for the second downlink control information;
    determining a transport block size of the downlink data message based at least in part on the first resource allocation for the downlink transmission and the quantity of resource elements allocated for the second downlink control information; and
    processing the downlink transmission based at least in part on the transport block size of the downlink data message.

2. The method of claim 1, further comprising:
    determining a resource element density associated with the second downlink control information based at least in part on the second resource allocation, wherein determining the transport block size of the downlink data message is based at least in part on the resource element density associated with the second downlink control information.

3. The method of claim 2, further comprising:
    receiving, from the network entity, an indication of a quantity of symbols allocated for the second downlink control information; and
    determining a quantity of resource elements allocated for the second downlink control information based at least in part on the resource element density and the quantity of symbols allocated for the second downlink control information, wherein determining the transport block size is based at least in part on the quantity of symbols allocated for the second downlink control information.

4. The method of claim 2, wherein the resource element density comprises a quantity of resource elements per resource block allocated for the second downlink control information.

5. The method of claim 1, further comprising:
    processing the second downlink control information based at least in part on the quantity of resource elements allocated for the second downlink control information.

6. The method of claim 1, wherein the indication of the second resource allocation for the second downlink control information is received via the first downlink control information.

7. The method of claim 1, further comprising:
receiving, via a first bit field of the first downlink control information, an indication that the downlink transmission includes the downlink data message; and
receiving, via a second bit field of the first downlink control information, an indication that the downlink transmission includes the second downlink control information, wherein determining that the downlink transmission includes the downlink data message multiplexed with the second downlink control information is based at least in part on the first bit field and the second bit field.

8. The method of claim 1, wherein determining the transport block size further comprises:
determining a third resource allocation for the downlink data message based at least in part on the first resource allocation for the downlink transmission and the second resource allocation for the second downlink control information, wherein the transport block size is based at least in part on the third resource allocation.

9. The method of claim 8, wherein determining the third resource allocation for the downlink data message comprises:
determining a first quantity of resource elements allocated for the downlink transmission based at least in part on the first resource allocation; and
determining a third quantity of resource elements allocated for the downlink data message based at least in part on the first quantity of resource elements and the quantity of resource elements allocated for the second downlink control information, wherein the transport block size is based at least in part on the third quantity of resource elements.

10. The method of claim 9, further comprising:
receiving, from the network entity, an indication of a modulation and coding scheme associated with the downlink transmission, a quantity of layers associated with the downlink transmission, a quantity of codewords associated with the downlink transmission, or any combination thereof, wherein determining the transport block size is based at least in part on the third quantity of resource elements and the modulation and coding scheme, the quantity of layers, the quantity of codewords, or any combination thereof.

11. A method for wireless communication at a network entity, comprising:
transmitting, to a user equipment (UE), first downlink control information scheduling a downlink transmission at the UE, the first downlink control information comprising an indication of a first resource allocation for the downlink transmission;
determining that the downlink transmission includes a downlink data message multiplexed with second downlink control information;
transmitting, to the UE, an indication of a second resource allocation for the second downlink control information, wherein the second resource allocation comprises an indication of a quantity of resource elements of the downlink transmission allocated for the second downlink control information;
determining a transport block size of the downlink data message based at least in part on the first resource allocation for the downlink transmission and the quantity of resource elements allocated for the second downlink control information; and transmitting, to the UE, the downlink transmission based at least in part on the transport block size of the downlink data message.

12. The method of claim 11, further comprising:
determining a resource element density associated with the second downlink control information based at least in part on the second resource allocation, wherein determining the transport block size of the downlink data message is based at least in part on the resource element density associated with the second downlink control information.

13. The method of claim 12, further comprising:
transmitting, to the UE, an indication of a quantity of symbols allocated for the second downlink control information; and
determining a quantity of resource elements allocated for the second downlink control information based at least in part on the resource element density and the quantity of symbols allocated for the second downlink control information, wherein determining the transport block size is based at least in part on the quantity of symbols allocated for the second downlink control information.

14. The method of claim 12, wherein the resource element density comprises a quantity of resource elements per resource block allocated for the second downlink control information.

15. The method of claim 11, wherein the indication of the second resource allocation for the second downlink control information is transmitted via the first downlink control information.

16. The method of claim 11, further comprising:
transmitting, via a first bit field of the first downlink control information, an indication that the downlink transmission includes the downlink data message; and
transmitting, via a second bit field of the first downlink control information, an indication that the downlink transmission includes the second downlink control information, wherein determining that the downlink transmission includes the downlink data message multiplexed with the second downlink control information is based at least in part on the first bit field and the second bit field.

17. An apparatus for wireless communication at a user equipment (UE), comprising:
a processor,
memory coupled to the processor; and
instructions stored in the memory and executable by the processor to cause the apparatus to:
receive, from a network entity, first downlink control information scheduling a downlink transmission at the UE, the first downlink control information comprising an indication of a first resource allocation for the downlink transmission;
determine that the downlink transmission includes a downlink data message multiplexed with second downlink control information;
receive, from the network entity, an indication of a second resource allocation for the second downlink control information, wherein the second resource allocation comprises an indication of a quantity of resource elements of the downlink transmission allocated for the second downlink control information;
determine a transport block size of the downlink data message based at least in part on the first resource allocation for the downlink transmission and the quantity of resource elements allocated for the second downlink control information; and process the downlink transmission based at least in part on the transport block size of the downlink data message.

18. The apparatus of claim 17, wherein the instructions are further executable by the processor to cause the apparatus to:
determine a resource element density associated with the second downlink control information based at least in part on the second resource allocation, wherein determining the transport block size of the downlink data message is based at least in part on the resource element density associated with the second downlink control information.

19. The apparatus of claim 18, wherein the instructions are further executable by the processor to cause the apparatus to:
receive, from the network entity, an indication of a quantity of symbols allocated for the second downlink control information; and
determine a quantity of resource elements allocated for the second downlink control information based at least in part on the resource element density and the quantity of symbols allocated for the second downlink control information, wherein determining the transport block size is based at least in part on the quantity of symbols allocated for the second downlink control information.

20. The apparatus of claim 18, wherein the resource element density comprises a quantity of resource elements per resource block allocated for the second downlink control information.

21. The apparatus of claim 17, further comprising:
process the second downlink control information based at least in part on the quantity of resource elements allocated for the second downlink control information.

22. The apparatus of claim 17, wherein the indication of the second resource allocation for the second downlink control information is received via the first downlink control information.

23. The apparatus of claim 17, wherein the instructions are further executable by the processor to cause the apparatus to:
receive, via a first bit field of the first downlink control information, an indication that the downlink transmission includes the downlink data message; and
receive, via a second bit field of the first downlink control information, an indication that the downlink transmission includes the second downlink control information, wherein determining that the downlink transmission includes the downlink data message multiplexed with the second downlink control information is based at least in part on the first bit field and the second bit field.

24. The apparatus of claim 17, wherein the instructions to determine the transport block size further are executable by the processor to cause the apparatus to:
determine a third resource allocation for the downlink data message based at least in part on the first resource allocation for the downlink transmission and the second resource allocation for the second downlink control information, wherein the transport block size is based at least in part on the third resource allocation.

25. The apparatus of claim 24, wherein the instructions to determine the third resource allocation for the downlink data message are executable by the processor to cause the apparatus to:
determine a first quantity of resource elements allocated for the downlink transmission based at least in part on the first resource allocation; and
determine a third quantity of resource elements allocated for the downlink data message based at least in part on the first quantity of resource elements and the quantity of resource elements allocated for the second downlink control information, wherein the transport block size is based at least in part on the third quantity of resource elements.

26. The apparatus of claim 25, wherein the instructions are further executable by the processor to cause the apparatus to:
receive, from the network entity, an indication of a modulation and coding scheme associated with the downlink transmission, a quantity of layers associated with the downlink transmission, a quantity of codewords associated with the downlink transmission, or any combination thereof, wherein determining the transport block size is based at least in part on the third quantity of resource elements and the modulation and coding scheme, the quantity of layers, the quantity of codewords, or any combination thereof.

27. An apparatus for wireless communication at a network entity, comprising:
a processor,
memory coupled to the processor; and
instructions stored in the memory and executable by the processor to cause the apparatus to:
transmit, to a user equipment (UE), first downlink control information scheduling a downlink transmission at the UE, the first downlink control information comprising an indication of a first resource allocation for the downlink transmission;
determine that the downlink transmission includes a downlink data message multiplexed with second downlink control information;
transmit, to the UE, an indication of a second resource allocation for the second downlink control information, wherein the second resource allocation comprises an indication of a quantity of resource elements of the downlink transmission allocated for the second downlink control information;
determine a transport block size of the downlink data message based at least in part on the first resource allocation for the downlink transmission and the quantity of resource elements allocated for the second downlink control information; and
transmit, to the UE, the downlink transmission based at least in part on the transport block size of the downlink data message.

28. The apparatus of claim 27, wherein the instructions are further executable by the processor to cause the apparatus to:
determine a resource element density associated with the second downlink control information based at least in part on the second resource allocation, wherein determining the transport block size of the downlink data message is based at least in part on the resource element density associated with the second downlink control information.

29. The apparatus of claim 28, wherein the instructions are further executable by the processor to cause the apparatus to:
transmit, to the UE, an indication of a quantity of symbols allocated for the second downlink control information; and
determine a quantity of resource elements allocated for the second downlink control information based at least in part on the resource element density and the quantity of symbols allocated for the second downlink control information, wherein determining the transport block size is based at least in part on the quantity of symbols allocated for the second downlink control information.

\* \* \* \* \*